US012783837B2

(12) United States Patent
Akaishi

(10) Patent No.: US 12,783,837 B2
(45) Date of Patent: Nov. 3, 2026

(54) IMAGE PROCESSING APPARATUS, IMAGE PROCESSING METHOD, AND IMAGE PROCESSING SYSTEM

(71) Applicant: CANON KABUSHIKI KAISHA, Tokyo (JP)

(72) Inventor: Takahisa Akaishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 18/626,611

(22) Filed: Apr. 4, 2024

(65) Prior Publication Data

US 2024/0346272 A1 Oct. 17, 2024

(30) Foreign Application Priority Data

Apr. 17, 2023 (JP) ................................ 2023-067044

(51) Int. Cl.
*G06K 15/02* (2006.01)

(52) U.S. Cl.
CPC . *G06K 15/1832* (2013.01); *G06K 2215/0031* (2013.01); *G06K 2215/101* (2013.01)

(58) Field of Classification Search
None
See application file for complete search history.

(56) References Cited

U.S. PATENT DOCUMENTS 6,614,873 B1 * 9/2003 Taylor .................... A61B 6/465 378/62
7,075,679 B2 * 7/2006 Goto ........................ H04N 1/60 358/523
8,755,622 B2 * 6/2014 Shohara ................. H04N 9/646 382/166
2005/0276500 A1 * 12/2005 Nakayama ............. H04N 19/60 375/E7.14
2005/0276501 A1 * 12/2005 Nakayama ............. H04N 19/60 375/E7.184
2009/0252427 A1 * 10/2009 Kishi ..................... H04N 19/18 382/251
2010/0189350 A1 * 7/2010 Shohara ................. H04N 9/646 382/167
2012/0170842 A1 * 7/2012 Liu ........................... G06T 5/50 382/167
2017/0255846 A1 * 9/2017 Nishio ............... G06K 15/1872
2022/0375088 A1 * 11/2022 Shah ...................... G06T 1/0007
2026/0087769 A1 * 3/2026 Zhang .................... G06V 10/42

FOREIGN PATENT DOCUMENTS

JP 2010-278889 A 12/2010

* cited by examiner

*Primary Examiner* — Helen Zong
(74) *Attorney, Agent, or Firm* — VENABLE LLP

(57) ABSTRACT

An image processing apparatus acquiring image data whose color information is defined by N-bit signal values; acquiring data range information; quantizing the signal values for each of the color components in the acquired image data into M-bit signal values (N>M) based on the data range information; and a transmitting unit configured to transmit the quantized image data, wherein the quantizing is performed so that the maximum value of the signal values for each of the color components in the acquired image data becomes a maximum possible value in the range of the M bits, and the minimum value of the signal values for each of the color components in the acquired image data becomes a minimum possible value in the range of the M bits.

14 Claims, 16 Drawing Sheets

| C | M | Y | K | L* | a* | b* |
|---|---|---|---|---|---|---|
| 0 | 0 | 65535 | 0 | 90.56 | -4.80 | 113.07 |
| 7967 | 0 | 65535 | 0 | 85.81 | -13.90 | 105.00 |
| 16191 | 0 | 65535 | 0 | 80.33 | -23.16 | 95.67 |
| 24415 | 0 | 65535 | 0 | 74.65 | -32.42 | 86.07 |
| 32639 | 0 | 65535 | 0 | 68.81 | -42.46 | 76.41 |
| 40863 | 0 | 65535 | 0 | 63.14 | -52.11 | 67.44 |
| 49087 | 0 | 65535 | 0 | 57.51 | -62.58 | 57.75 |
| 57311 | 0 | 65535 | 0 | 52.00 | -73.22 | 48.10 |
| 65535 | 0 | 65535 | 0 | 48.54 | -83.36 | 36.89 |
| 65535 | 0 | 57311 | 0 | 41.22 | -88.48 | 25.64 |
| 65535 | 0 | 49087 | 0 | 38.31 | -86.65 | 12.33 |
| 65535 | 0 | 40863 | 0 | 38.21 | -81.31 | -0.88 |
| 65535 | 0 | 32639 | 0 | 40.94 | -75.54 | -12.60 |
| 65535 | 0 | 24415 | 0 | 45.28 | -68.47 | -24.02 |
| 65535 | 0 | 16191 | 0 | 49.72 | -61.09 | -34.29 |
| 65535 | 0 | 7967 | 0 | 53.52 | -53.76 | -43.58 |
| 65535 | 0 | 0 | 0 | 57.49 | -46.39 | -52.84 |
| 65535 | 7967 | 0 | 0 | 49.51 | -37.26 | -61.27 |
| 65535 | 16191 | 0 | 0 | 42.34 | -22.46 | -67.29 |
| 65535 | 24415 | 0 | 0 | 36.81 | -8.29 | -71.34 |
| 65535 | 32639 | 0 | 0 | 31.88 | 6.34 | -75.13 |
| 65535 | 40863 | 0 | 0 | 27.45 | 20.09 | -78.47 |
| 65535 | 49087 | 0 | 0 | 22.85 | 34.38 | -81.21 |
| 65535 | 57311 | 0 | 0 | 20.91 | 48.79 | -80.70 |
| 65535 | 65535 | 0 | 0 | 25.68 | 60.78 | -70.57 |
| 57311 | 65535 | 0 | 0 | 27.67 | 62.03 | -61.42 |
| 49087 | 65535 | 0 | 0 | 30.70 | 63.31 | -52.17 |
| 40863 | 65535 | 0 | 0 | 34.40 | 65.44 | -43.60 |
| 32639 | 65535 | 0 | 0 | 38.25 | 68.33 | -34.74 |
| 24415 | 65535 | 0 | 0 | 42.10 | 71.56 | -26.55 |
| 16191 | 65535 | 0 | 0 | 45.96 | 75.22 | -18.78 |
| 7967 | 65535 | 0 | 0 | 49.18 | 78.80 | -10.84 |
| 0 | 65535 | 0 | 0 | 51.91 | 82.38 | -2.81 |
| 0 | 65535 | 7967 | 0 | 50.64 | 82.23 | 6.59 |
| 0 | 65535 | 16191 | 0 | 50.00 | 81.31 | 16.53 |
| 0 | 65535 | 24415 | 0 | 50.15 | 80.26 | 26.76 |
| 0 | 65535 | 32639 | 0 | 50.31 | 79.49 | 36.47 |
| 0 | 65535 | 40863 | 0 | 50.57 | 78.96 | 46.42 |
| 0 | 65535 | 49087 | 0 | 50.99 | 78.57 | 56.76 |
| 0 | 65535 | 57311 | 0 | 51.28 | 78.61 | 67.13 |
| 0 | 65535 | 65535 | 0 | 51.65 | 78.94 | 77.96 |
| 0 | 57311 | 65535 | 0 | 57.64 | 70.03 | 79.56 |
| 0 | 49087 | 65535 | 0 | 62.40 | 59.05 | 84.03 |
| 0 | 40863 | 65535 | 0 | 67.00 | 48.44 | 88.79 |
| 0 | 32639 | 65535 | 0 | 71.89 | 37.05 | 93.99 |
| 0 | 24415 | 65535 | 0 | 76.92 | 25.78 | 99.22 |
| 0 | 16191 | 65535 | 0 | 81.29 | 16.19 | 103.95 |
| 0 | 7967 | 65535 | 0 | 85.94 | 5.98 | 109.07 |
| 0 | 0 | 65535 | 0 | 90.56 | -4.80 | 113.07 |

FIG.3

401 402 403

| Input CRPC5 CMYK | | | | Output Inkjet Printer CMYK (16bit) | | | | Output Inkjet Printer CMYK (%) | | | |
|---|---|---|---|---|---|---|---|---|---|---|---|
| C | M | Y | K | C | M | Y | K | C | M | Y | K |
| 0 | 0 | 65535 | 0 | 0 | 3341 | 46517 | 0 | 0.00 | 5.10 | 70.98 | 0.00 |
| 7967 | 0 | 65535 | 0 | 2570 | 3598 | 45489 | 0 | 3.92 | 5.49 | 69.41 | 0.00 |
| 16191 | 0 | 65535 | 0 | 6939 | 4883 | 44204 | 0 | 10.59 | 7.45 | 67.45 | 0.00 |
| 24415 | 0 | 65535 | 0 | 12593 | 6168 | 43176 | 0 | 19.22 | 9.41 | 65.88 | 0.00 |
| 32639 | 0 | 65535 | 0 | 18761 | 7196 | 43176 | 0 | 28.63 | 10.98 | 65.88 | 0.00 |
| 40863 | 0 | 65535 | 0 | 25957 | 7967 | 43176 | 0 | 39.61 | 12.16 | 65.88 | 0.00 |
| 49087 | 0 | 65535 | 0 | 34181 | 8224 | 44204 | 0 | 52.16 | 12.55 | 67.45 | 0.00 |
| 57311 | 0 | 65535 | 0 | 41891 | 8738 | 45746 | 0 | 63.92 | 13.33 | 69.80 | 0.00 |
| 65535 | 0 | 65535 | 0 | 47802 | 8995 | 47031 | 0 | 72.94 | 13.73 | 71.76 | 0.00 |
| 65535 | 0 | 57311 | 0 | 47545 | 8995 | 42405 | 0 | 72.55 | 13.73 | 64.71 | 0.00 |
| 65535 | 0 | 49087 | 0 | 47545 | 9252 | 37265 | 0 | 72.55 | 14.12 | 56.86 | 0.00 |
| 65535 | 0 | 40863 | 0 | 48059 | 8995 | 31868 | 0 | 73.33 | 13.73 | 48.63 | 0.00 |
| 65535 | 0 | 32639 | 0 | 48573 | 8481 | 25957 | 0 | 74.12 | 12.94 | 39.61 | 0.00 |
| 65535 | 0 | 24415 | 0 | 49601 | 7967 | 20303 | 0 | 75.69 | 12.16 | 30.98 | 0.00 |
| 65535 | 0 | 16191 | 0 | 50629 | 7196 | 14392 | 0 | 77.25 | 10.98 | 21.96 | 0.00 |
| 65535 | 0 | 7967 | 0 | 52171 | 6168 | 8481 | 0 | 79.61 | 9.41 | 12.94 | 0.00 |
| 65535 | 0 | 0 | 0 | 54227 | 4883 | 2313 | 0 | 82.75 | 7.45 | 3.53 | 0.00 |
| 65535 | 7967 | 0 | 0 | 52685 | 9509 | 4112 | 0 | 80.39 | 14.51 | 6.27 | 0.00 |
| 65535 | 16191 | 0 | 0 | 51657 | 13878 | 5911 | 0 | 78.82 | 21.18 | 9.02 | 0.00 |
| 65535 | 24415 | 0 | 0 | 50886 | 18504 | 7453 | 0 | 77.65 | 28.24 | 11.37 | 0.00 |
| 65535 | 32639 | 0 | 0 | 50372 | 23387 | 8995 | 0 | 76.86 | 35.69 | 13.73 | 0.00 |
| 65535 | 40863 | 0 | 0 | 50372 | 29041 | 10537 | 0 | 76.86 | 44.31 | 16.08 | 0.00 |
| 65535 | 49087 | 0 | 0 | 50629 | 34438 | 12336 | 0 | 77.25 | 52.55 | 18.82 | 0.00 |
| 65535 | 57311 | 0 | 0 | 51143 | 39578 | 13878 | 0 | 78.04 | 60.39 | 21.18 | 0.00 |
| 65535 | 65535 | 0 | 0 | 51914 | 43947 | 14906 | 0 | 79.22 | 67.06 | 22.75 | 0.00 |
| 57311 | 65535 | 0 | 0 | 47802 | 46003 | 14649 | 0 | 72.94 | 70.20 | 22.35 | 0.00 |
| 49087 | 65535 | 0 | 0 | 42148 | 48830 | 14649 | 0 | 64.31 | 74.51 | 22.35 | 0.00 |
| 40863 | 65535 | 0 | 0 | 34952 | 51657 | 14649 | 0 | 53.33 | 78.82 | 22.35 | 0.00 |
| 32639 | 65535 | 0 | 0 | 27242 | 54227 | 14392 | 0 | 41.57 | 82.75 | 21.96 | 0.00 |
| 24415 | 65535 | 0 | 0 | 20817 | 56797 | 14392 | 0 | 31.76 | 86.67 | 21.96 | 0.00 |
| 16191 | 65535 | 0 | 0 | 14392 | 58339 | 13621 | 0 | 21.96 | 89.02 | 20.78 | 0.00 |
| 7967 | 65535 | 0 | 0 | 7967 | 59367 | 12336 | 0 | 12.16 | 90.59 | 18.82 | 0.00 |
| 0 | 65535 | 0 | 0 | 2056 | 60138 | 11051 | 0 | 3.14 | 91.76 | 16.86 | 0.00 |
| 0 | 65535 | 7967 | 0 | 1799 | 59110 | 13878 | 0 | 2.75 | 90.20 | 21.18 | 0.00 |
| 0 | 65535 | 16191 | 0 | 1542 | 58339 | 17219 | 0 | 2.35 | 89.02 | 26.27 | 0.00 |
| 0 | 65535 | 24415 | 0 | 1285 | 57568 | 20817 | 0 | 1.96 | 87.84 | 31.76 | 0.00 |
| 0 | 65535 | 32639 | 0 | 1285 | 57054 | 24672 | 0 | 1.96 | 87.06 | 37.65 | 0.00 |
| 0 | 65535 | 40863 | 0 | 1285 | 56540 | 28784 | 0 | 1.96 | 86.27 | 43.92 | 0.00 |
| 0 | 65535 | 49087 | 0 | 1285 | 56283 | 33153 | 0 | 1.96 | 85.88 | 50.59 | 0.00 |
| 0 | 65535 | 57311 | 0 | 1799 | 56283 | 37779 | 0 | 2.75 | 85.88 | 57.65 | 0.00 |
| 0 | 65535 | 65535 | 0 | 2056 | 56540 | 41634 | 0 | 3.14 | 86.27 | 63.53 | 0.00 |
| 0 | 57311 | 65535 | 0 | 2056 | 50629 | 42148 | 0 | 3.14 | 77.25 | 64.31 | 0.00 |
| 0 | 49087 | 65535 | 0 | 2056 | 42919 | 42662 | 0 | 3.14 | 65.49 | 65.10 | 0.00 |
| 0 | 40863 | 65535 | 0 | 1542 | 34952 | 42919 | 0 | 2.35 | 53.33 | 65.49 | 0.00 |
| 0 | 32639 | 65535 | 0 | 1028 | 27242 | 42919 | 0 | 1.57 | 41.57 | 65.49 | 0.00 |
| 0 | 24415 | 65535 | 0 | 514 | 20046 | 43433 | 0 | 0.78 | 30.59 | 66.27 | 0.00 |
| 0 | 16191 | 65535 | 0 | 514 | 14135 | 44204 | 0 | 0.78 | 21.57 | 67.45 | 0.00 |
| 0 | 7967 | 65535 | 0 | 257 | 8224 | 45232 | 0 | 0.39 | 12.55 | 69.02 | 0.00 |
| 0 | 0 | 65535 | 0 | 0 | 3341 | 46517 | 0 | 0.00 | 5.10 | 70.98 | 0.00 |

FIG.4A

| | C | M | Y | K |
|---|---|---|---|---|
| Min (%) | 0.00 | 5.10 | 3.53 | 0.00 |
| Max (%) | 82.75 | 91.76 | 71.76 | 0.00 |
| Range (%) | 82.75 | 86.67 | 68.24 | 0.00 |

FIG.4B

| | C | M | Y | K |
|---|---|---|---|---|
| MINIMUM VALUE | 2560 | 3840 | 1280 | 0 |
| MAXIMUM VALUE | 48640 | 51200 | 40960 | 53760 |
FIG.9A
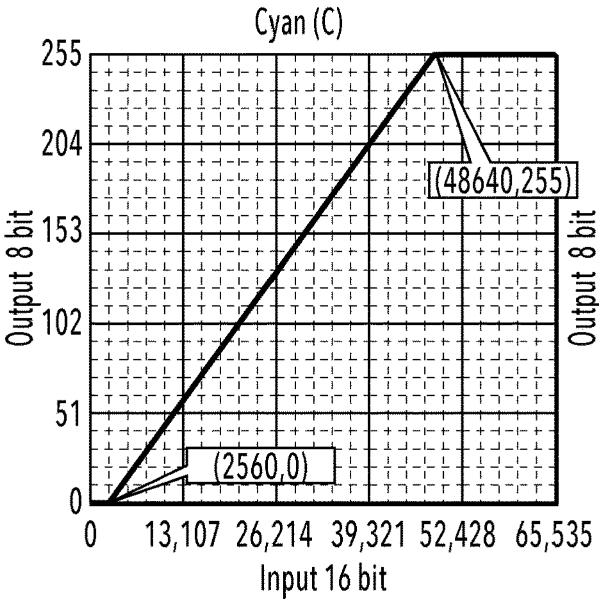
FIG.9B
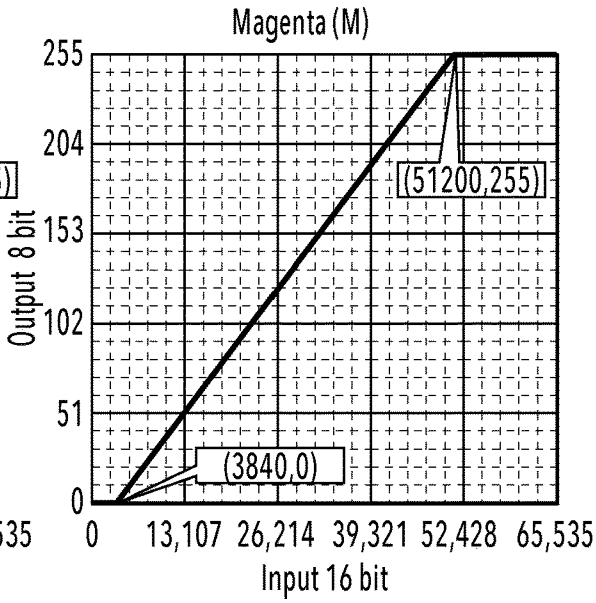
FIG.9C
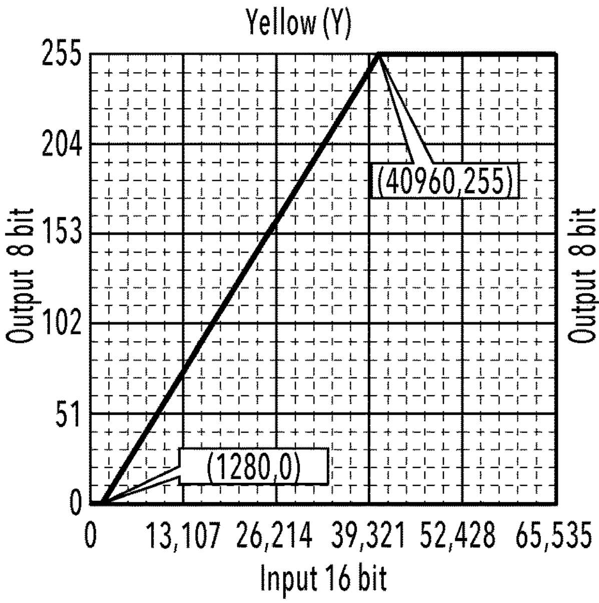
FIG.9D
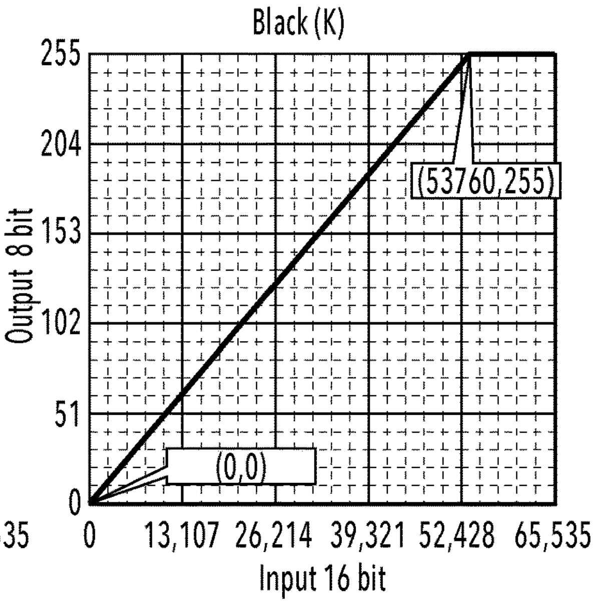
FIG.9E

IMAGE PROCESSING APPARATUS, IMAGE PROCESSING METHOD, AND IMAGE PROCESSING SYSTEM

BACKGROUND

Field

The present disclosure relates to a technology for quantizing the signal values of image data.

Description of the Related Art

There is a method of compressing data by quantizing the signal values of image data to a low number of bits.

In Japanese Patent Laid-Open No. 2010-278889, there is a description of a method of quantizing the signal values of image data to a low number of bits while inhibiting loss of the information amount of the image data. In Japanese Patent Laid-Open No. 2010-278889, a parameter for separating an input image into two areas, i.e., a dark image area and a light image area, is set and a grayscale map is generated indicating which of the dark image area and the light image area each pixel of the input image belongs to according to the set parameter. Then, based on the grayscale map and the quantization number of bits, quantization is performed on the signal values of each pixel of the input image using a quantization method corresponding to the area to which the pixel belongs.

SUMMARY

An image processing apparatus of the present disclosure includes: a first acquiring unit configured to acquire image data whose color information is defined by N-bit signal values for each of color components; a second acquiring unit configured to acquire data range information indicating a maximum value and minimum value of the signal values for each of the color components in the image data acquired by the first acquiring unit; a quantizing unit configured to perform a quantization to quantize the signal values for each of the color components in the image data acquired by the first acquiring unit into M-bit signal values (N>M) based on the data range information acquired by the second acquiring unit; and a transmitting unit configured to transmit the quantized image data and the data range information corresponding to the image data acquired by the first acquiring unit in order to convert the signal values of the quantized image data into L-bit signal values (L>M), wherein the quantizing unit performs the quantization so that the maximum value of the signal values for each of the color components in the acquired image data becomes a maximum possible value in the range of the M bits, and the minimum value of the signal values for each of the color components in the acquired image data becomes a minimum possible value in the range of the M bits.

Further features of the present disclosure will become apparent from the following description of exemplary embodiments with reference to the attached drawings.

BRIEF DESCRIPTION OF THE DRAWINGS

FIG. 3 is a diagram for explaining conversion parameters included in an ICC profile;

FIG. 4A and FIG. 4B are diagrams illustrating an example of the corresponding relationship between input-device-dependent signal values and output-device-dependent signal values after color conversion;

FIG. 9A to FIG. 9E are diagrams illustrating data range information and one-dimensional LUTs for quantization with graphs;

DESCRIPTION OF THE EMBODIMENTS

Hereinafter, embodiments of the technology of the present disclosure are explained with reference to the accompanying drawings. The configurations shown in the following embodiments are merely examples and the technology of the present disclosure is not limited to the illustrated configurations.

A printing apparatus may receive image data as printing target on which RIP processing and color conversion processing have been performed by an external image processing apparatus, and perform printing based on the received image data. In order to efficiently perform transmission and reception of image data, image data may be transmitted after reducing the data transmission amount by quantizing the signal values of the image data to a low number of bits. In this case, the process of quantization into signal values with a low number of bits needs to be performed by the image processing apparatus. In the image processing apparatus, it is preferable that quantization processing is executed using a simpler method that inhibits deterioration of image quality.

However, in the method disclosed in Japanese Patent Laid-Open No. 2010-278889, the image processing apparatus needs to execute complicated processing such as generating a grayscale map, determining a quantization method for each pixel of input image data based on the grayscale map, and quantizing the signal value of each pixel into a lower bit.

First Embodiment

In the fields of commercial and industrial printing, there are printing apparatuses capable of reproducing a wide color gamut. Such printing apparatuses use particular color inks in addition to process color inks including cyan (C), magenta (M), yellow (Y), and black (K) to implement color reproduction of a wide color gamut. The particular color inks include, for example, orange (O), green (G), blue (B), and the like.

Regarding offset printing, offset printing standards compliant with ISO 12647-2 have been established. For example, JananColor is used as a standard in Japan, SWAP and GRACoL in North America, and Euroscale in Europe, all of which comply with ISO standards. These standards prescribe reference paper, reference ink, reference measurement values for solid colors, and the like, and a color reproduction method is defined in ICC profiles. In addition, in ISO/PAS 15339-2, common color reproduction that is not dependent on a printing process is standardized, and the relationship between the tone values (CMYK %) and colorimetric values (CIE L*a*b*) is defined in datasets. The datasets are each referred to as a Characterized Reference Printing Condition (CRPC), and seven types are available depending on the size of the color space.

Figure 1:
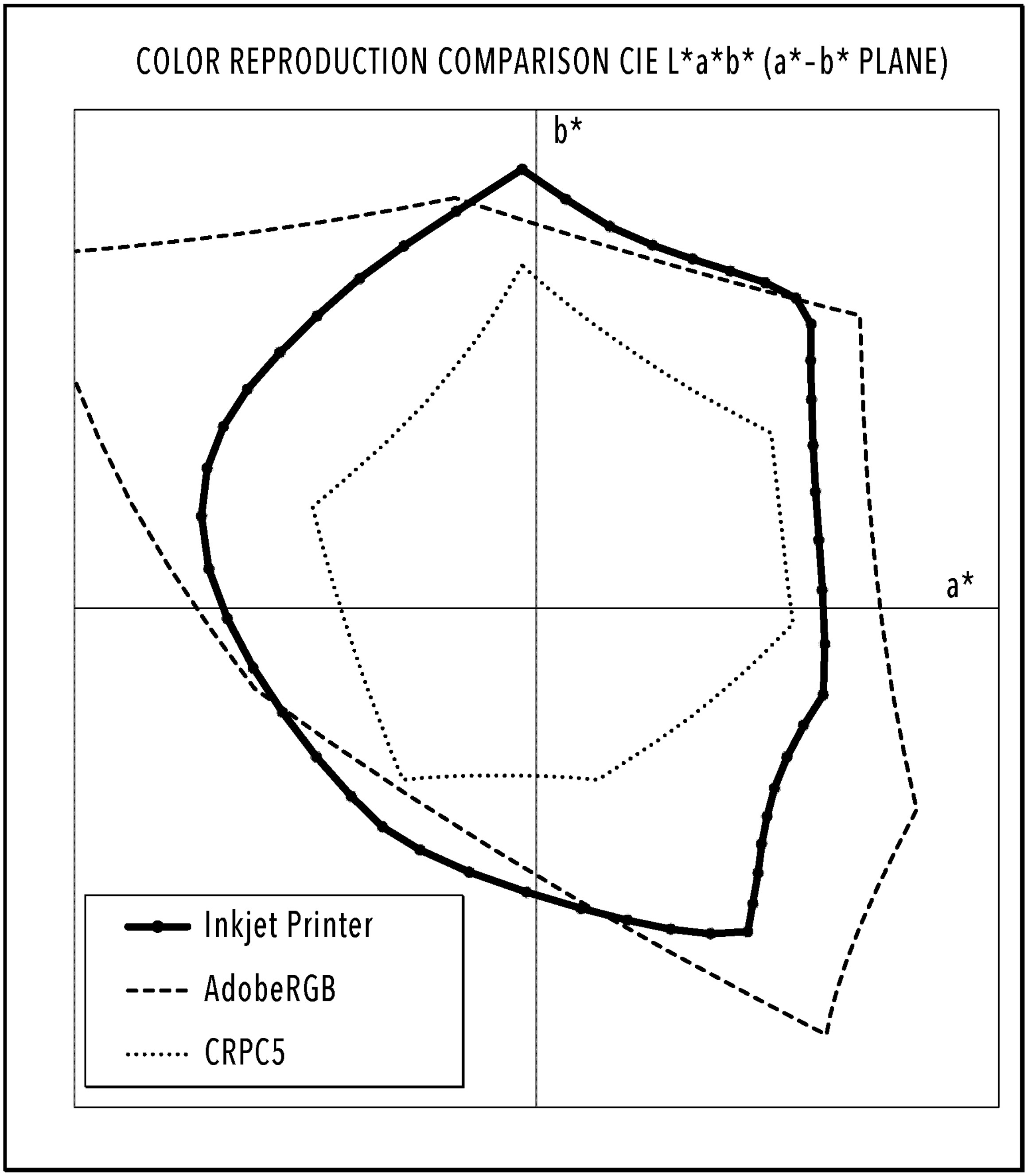
FIG. 1 is a diagram representing the size of the color gamut for each color space.

FIG. 1 is a diagram in which values corresponding to the boundaries of each reproducible color gamut of the following three color spaces are plotted on the a*b* plane of the CIE L*a*b* color space. In FIG. 1, the boundary of the color gamut of the Adobe RGB color space is represented by a dashed line. Further, the boundary of the reproducible color gamut in a case of offset printing of the CMYK color space defined by ISO/PAS 15339-2 for the CRPC5 is represented by a dotted line. Further, the boundary of the reproducible color gamut of an inkjet printer using the particular color inks of orange, green, and blue in addition to CMYK is represented by a solid line. CRPC5 is a typical target for publication printing. As illustrated in FIG. 1, the reproducible color gamut for offset printing is smaller than the color gamut of the Adobe RGB color space. Further, the reproducible color gamut of an inkjet printer equipped with the particular color inks of orange, green, and blue is able to be implemented so as to be larger than the color gamut of offset printing and be close to the size of the color gamut of the Adobe RGB color space.

In general, in commercial and industrial printing systems, a color management system (hereinafter referred to as a CMS) using ICC profiles is used as a measure for approximating the colors of received original image data and the colors of output printed material.

Figure 2:
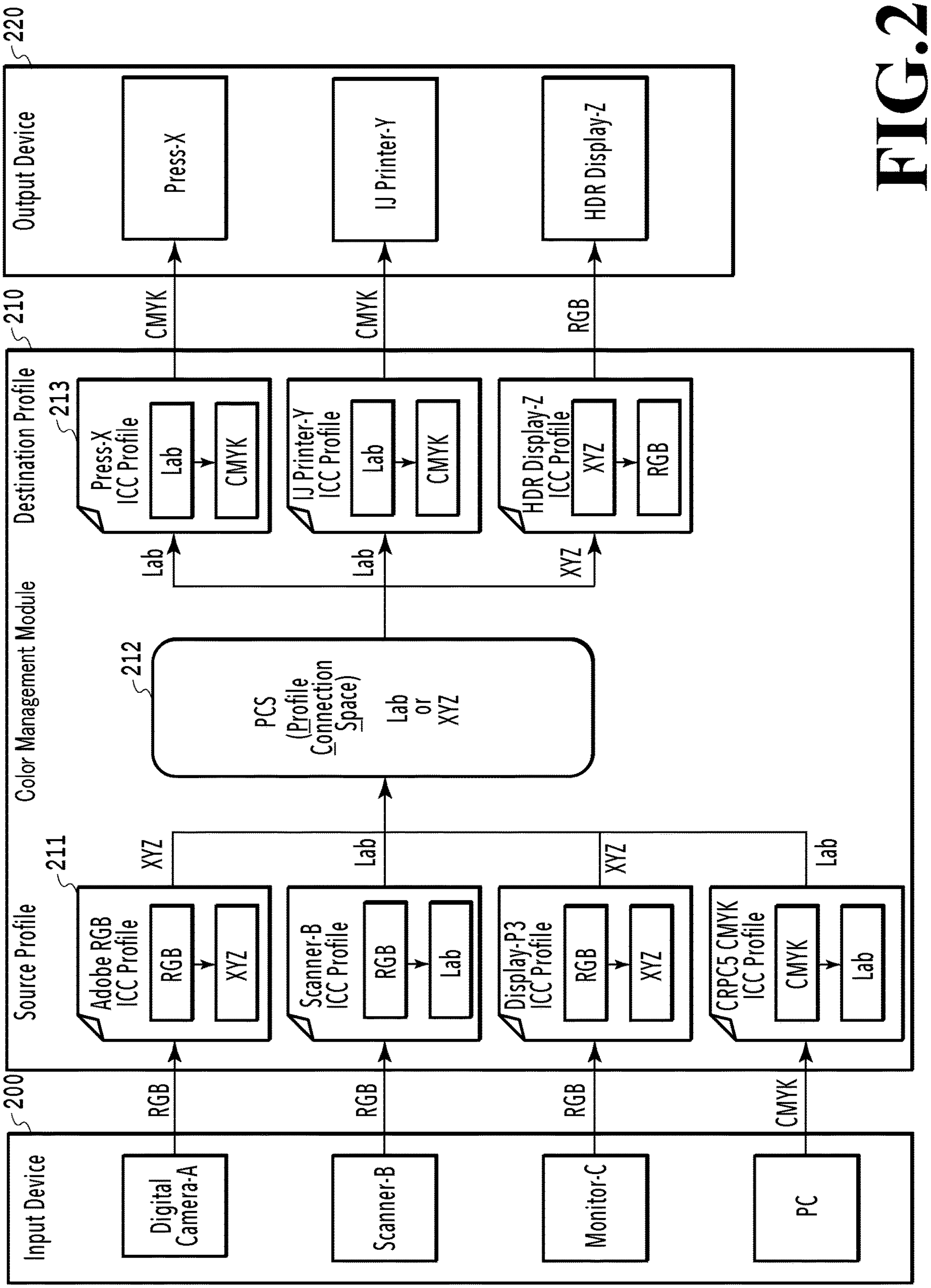
FIG. 2 is a conceptual diagram of a color management system.

FIG. 2 is a diagram illustrating a schematic diagram of the CMS. The Input Device 200 is an input device such as a digital camera, a scanner, a monitor, or a PC. Signal values of each color component constituting a color (hereinafter also simply referred to as signal values), which correspond to color information of the image data output from the Input Device 200, are input to the Color Management Module (hereinafter referred to as the CMM) 210. The signal values output from the Input Device 200 are signal values that depend on the Input Device 200 (the input device).

The Source Profile 211 is configured with ICC profiles that include conversion parameters for converting input-device-dependent signal values into signal values of a device-independent color space. Using the conversion parameters linked to the Input Device 200 included in the Source Profile 211 in the CMM 210, input-device-dependent signal values are converted into signal values of the PCS 212 that are signal values of a device-independent color space. The device-independent color space that is the PCS 212 uses the CIE L*a*b* color space or the CIE XYZ color space.

The Destination Profile 213 is configured with ICC profiles that include conversion parameters for converting signal values of a device-independent color space into output-device-dependent signal values. The signal values of the PCS 212 are converted from device-independent signal values into output-device-dependent signal values using conversion parameters linked to the Output Device 220 in the Destination Profile 213. Then, the image data whose color information is defined by the converted signal values is transmitted to the Output Device 220 (the output device).

In a case where the output device is a printing apparatus such as an inkjet printer, the output-device-dependent signal values are represented by the signal values of each CMYK channel (each color component) corresponding to the ink type. In a case where the output device is a printer, the conversion parameters included in the Destination Profile 213 are created so that the maximum value possible for the output-device-dependent signal values become the signal value where the output device applies ink with the maximum output.

FIG. 3 is a diagram for explaining the conversion parameters included in the ICC profiles that constitute the Destination Profile 213. The ICC profiles that constitute the Destination Profile 213 include, as a conversion parameter, a color conversion table (a look up table (LUT)) for converting device-independent signal values to output-device-dependent signal values. Further, a color conversion table for converting output-device-dependent signal values into device-independent signal values is also included as a conversion parameter. FIG. 3 represents a color conversion LUT for converting device-dependent signal values into output-device-independent signal values. In FIG. 3, each CMYK signal value, which is an output-device-dependent signal value, is a 16-bit signal value (the maximum value possible=65,535) that corresponds to the reproducible color gamut of an inkjet printer using particular color ink. Further, in FIG. 3, the device-independent signal values are each L*a*b* signal values.

The colors corresponding to the vertices of the gamut (the reproducible color gamut) of the CMYK color space illustrated in FIG. 1 are the primary colors of green, cyan, blue, magenta, red, and yellow. The combinations of each of the CMYK signal values in FIG. 3 correspond to colors at positions picked up at equal intervals from the boundary of the reproducible color gamut.

Each of the primary colors of green, cyan, blue, magenta, red, and yellow, which correspond to the vertices of the reproducible color gamut, have signal values represented as percentages, that is, Yellow (C, M, Y, K)=(0, 0, 100%, 0), Green (C, M, Y, K)=(100%, 0, 100%, 0), Cyan (C, M, Y, K)=(100%, 0, 0, 0), Blue (C, M, Y, K)=(100%, 100%, 0, 0), Magenta (C, M, Y, K)=(0,100%, 0,0), and Red (C, M, Y, K)=(0, 100%, 100%, 0). As illustrated in FIG. 3, in the combinations of signal values indicating colors of the boundary corresponding to the line connecting each vertex of the reproducible color gamut, a signal value of any one of the CMYK channels is 65,535, which is the maximum value possible.

The reproducible color gamut of a printer that does not use particular color ink is, for example, a color gamut range similar to the CMYK color space of CRPC5 as illustrated by the dotted line in FIG. 1. Therefore, in a case where such a printer performs printing based on image data created with colors with high saturation in the CMYK color space of CRPC5, ink is used at maximum output to reproduce colors. If the signal values of such original image data are color converted into 16-bit signal values, the maximum value of the output-device-dependent signal values after color conversion becomes a value close to 65,535, which is the maximum value possible, and the minimum value becomes a value close to 0, which is the minimum value possible. That is, the signal values are converted into output-device-dependent signal values with almost the full range of the data range from the maximum value to the minimum value of the signal values. On the other hand, since the reproducible color gamut of an inkjet printer using particular color ink is wide, the output-device-dependent signal values corresponding to an inkjet printer using particular color ink may not be values close to the full range.

FIG. 4A is a diagram illustrating an example of the correspondence between input-device-dependent signal values and output-device-dependent signal values after color conversion is performed on the signal values by the CMS. In the Input Column 401 in FIG. 4A, the signal values in the CMYK color space of CRPC5 are held as 16-bit input-device-dependent signal values. The Output Column 402 holds combinations (colors) of 16-bit output-device-dependent signal values after color conversion, which correspond to the combinations (colors) of the signal values held in the Column 401. The output-device-dependent signal values in FIG. 4A are CMYK signal values corresponding to a reproducible color gamut of an inkjet printer using particular color ink. In a case where printing based on original image data created with the CMYK color space of CRPC5 is performed by an inkjet printer using particular color ink, the inkjet printer can reproduce the colors of the original image data without using the maximum output. That is, as illustrated in FIG. 4A, the maximum value of the output-device-dependent signal values after color conversion is not 65,535, which is the maximum possible value of 16 bits.

The Column 403 in FIG. 4A holds values obtained by displaying the 16-bit signal values in the Column 402 in percentage. In percentage display, a signal value is represented with the maximum value possible for a signal value as 100%. That is, in a case of 16 bits, a signal value of 65,535 is expressed as 100%.

FIG. 4B is a diagram illustrating the data ranges (the maximum values and minimum values) of the signal values of each color component after color conversion in the Column 403. As illustrated in FIG. 4A, looking at the signal values of the Y channel (the Y color component) in the Column 403, the maximum value is 71.76%, and the minimum value is 3.53%. The Range (%) in FIG. 4B holds the differences between the maximum values and minimum values of the signal values of the respective CMYK channels. For the signal values of the Y channel after being converted into output-device-dependent signal values, it can be seen that only 68.24% out of the full range (100%) are used. Therefore, it is shown that inkjet printers that can reproduce a wide color gamut can reproduce the colors of image data in the CMYK color space of CRPC5, which has a narrow color gamut, without having to output ink so as to correspond to the full range of signal values of each CMYK channel.

[Regarding the Printing System]

In the present embodiment, as an example, an explanation is given of a printing system related to commercial and industrial printing. The printing system includes an image processing apparatus and a printing apparatus. The printing system of the present embodiment is a system for directly opening an original image file and printing it. Alternatively, it is a system for commercial printing that receives a print job, which is generated based on an original image file by a print management application such as a workflow RIP, and performs printing.

[Hardware Configuration of the Printing Apparatus]

Figure 5:
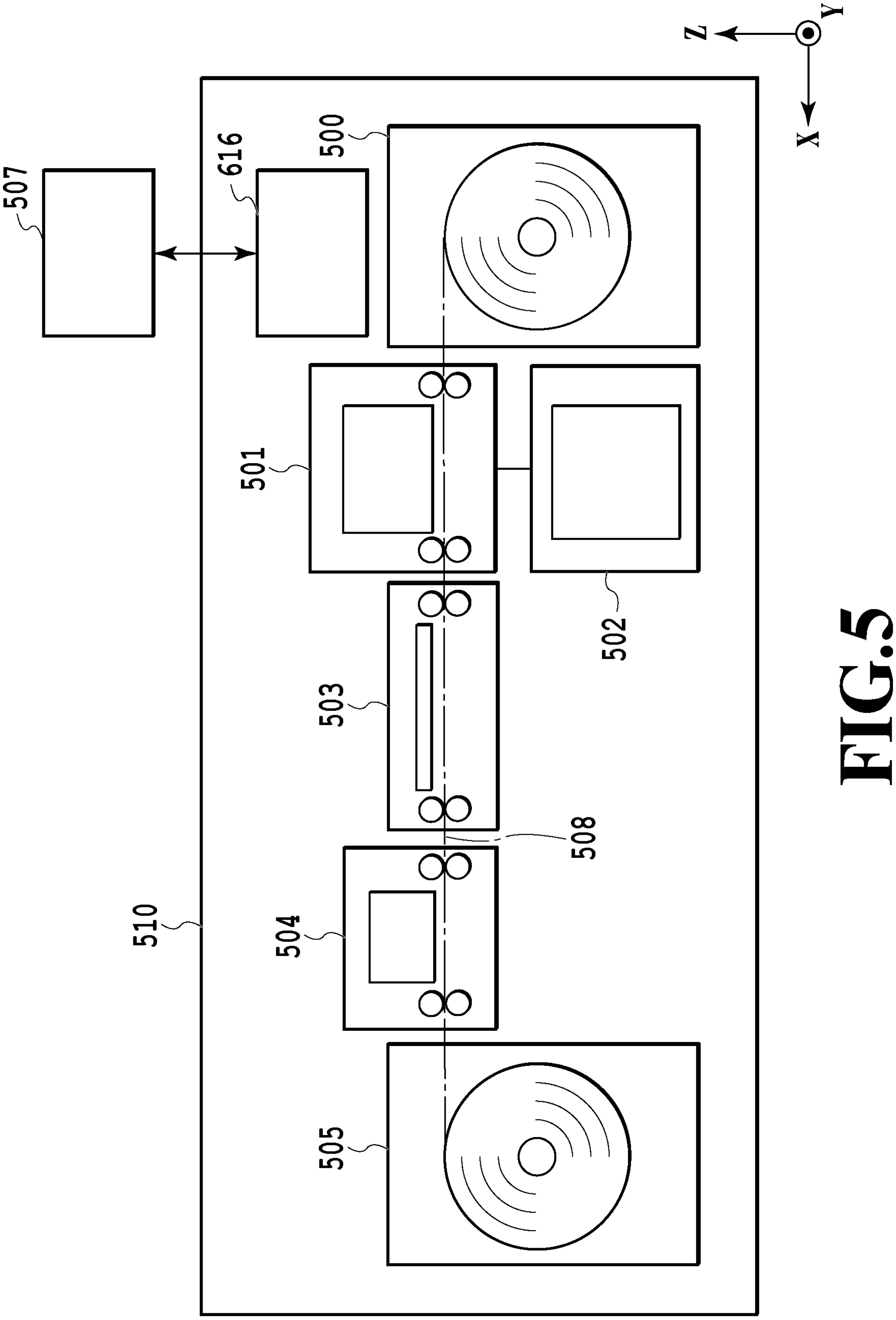
FIG. 5 is a diagram for explaining an internal configuration of a printing apparatus.

FIG. 5 is a diagram for explaining the internal configuration of the printing apparatus 510 included in the printing system of the present embodiment. An explanation is given on the premise that the printing apparatus 510 is, as an example, a line printer that performs printing on a recording medium (also referred to as a medium) in one pass. Further, the explanation is given on the premise that the medium is a continuous sheet in the form of a roll. The printing apparatus 510 includes each unit of the continuous sheet supply unit 500, the printing unit 501, the ink supply unit 502, the drying unit 503, the reading unit 504, and the sheet discharge unit 505. The continuous sheet is conveyed by a conveyance mechanism including a pair of rollers, a belt, and the like along the continuous sheet conveyance path 508 illustrated as a dashed line in FIG. 5, and is processed by each unit.

The continuous sheet supply unit 500 stores the continuous sheet wound into the form of a roll, and also supplies the continuous sheet to the conveyance path 508.

The printing unit 501 has a print head and multiple conveyance rollers that convey the continuous sheet. The print head prints an image onto the continuous sheet being conveyed. The explanation is given on the premise that the print head is a print head that performs printing using an inkjet scheme. The inks used for printing are assumed to be seven colors (CMYKOGB) including the four colors of cyan, magenta, yellow, and black (CMYK) in addition to the three particular colors of orange, green, and blue (OGB). The inkjet printing scheme is a well-known technology, and thus a detailed explanation thereof is omitted.

The print head is, for example, a line type print head in which a nozzle array in an inkjet scheme is formed in a range that covers the maximum width of a continuous sheet expected to be used. Regarding the print head, multiple print heads corresponding to multiple inks are lined up in parallel along the conveyance direction (the x direction) of the continuous sheet. As the method for ejecting ink using the inkjet scheme, it is possible to employ a scheme using heating elements, a scheme using piezoelectric elements, a scheme using electrostatic elements, a scheme using MEMS elements, or the like. Ink of each color is supplied from the ink supply unit 502 to the print head via a respective ink tube. Further, the print head moves in the vertical direction (the z direction) to perform a capping operation. Furthermore, the print head moves in the perpendicular direction (the y direction). The print head is equipped with a mechanism and a driving motor to perform this operation.

The drying unit 503 is a unit that heats the sheet printed by the printing unit 501 and dries the applied ink in a short time. The drying unit 503 is also equipped with a conveyance belt and conveyance rollers for sending the sheet to the next process.

The reading unit 504 performs processing to read a test pattern for maintenance of the print head, which is printed by the printing unit 501.

The sheet discharge unit 505 is equipped with a winding apparatus that winds up the printed and dried medium into the form of a roll and discharges it.

[Control Configuration of the Printing System]

Figure 6:
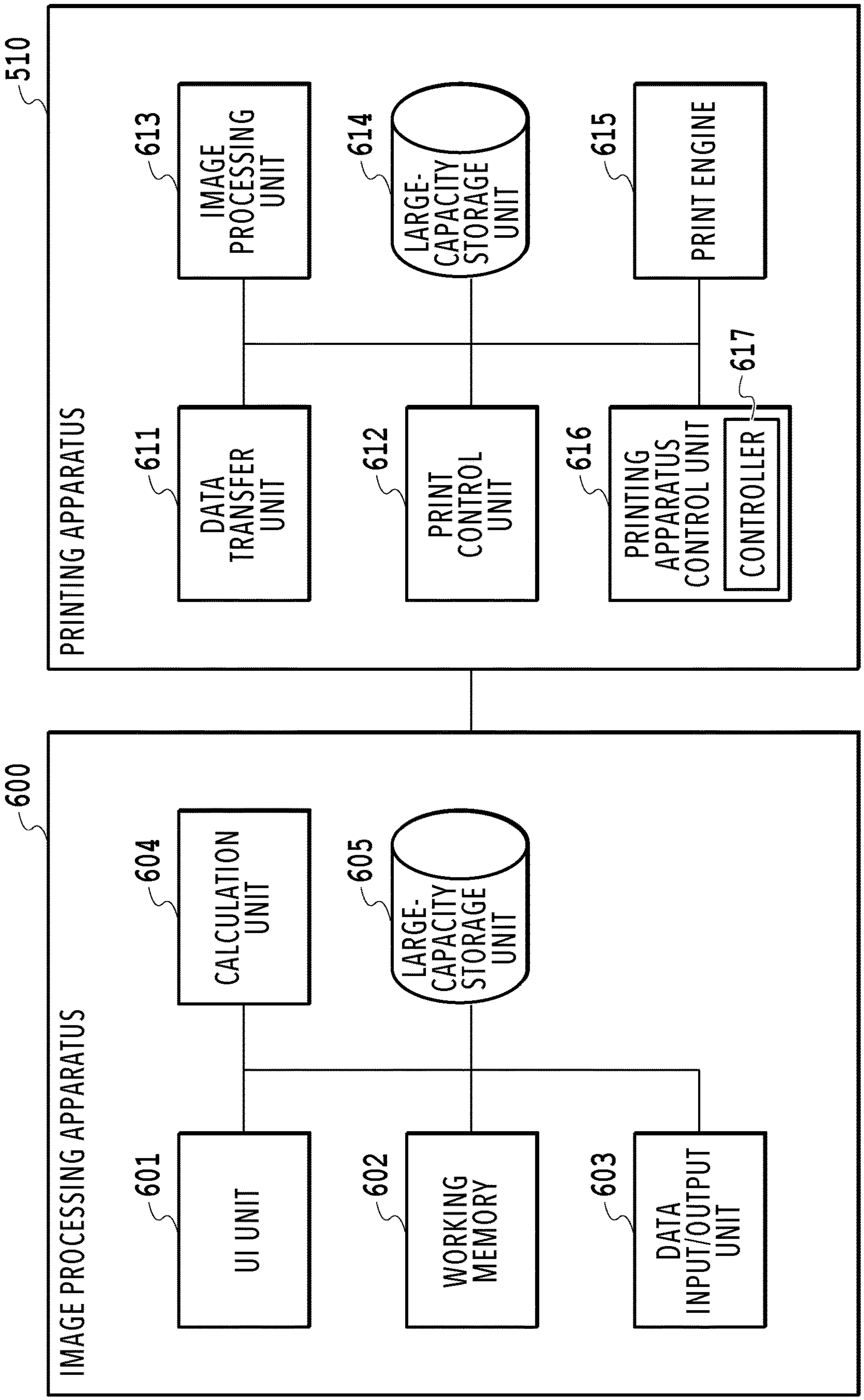
FIG. 6 is a block diagram for explaining a control configuration of an image processing apparatus and the printing apparatus.

FIG. 6 is a block diagram for explaining the control configuration of the image processing apparatus 600 and the printing apparatus 510 included in the printing system of the present embodiment. First, an explanation is given of the image processing apparatus 600. The image processing apparatus 600 receives original image data including a PDL rendering command from an input device, performs RIP processing on the received original image data, and performs color conversion into signal values of an output-device-dependent color space using a CMS such as that illustrated in FIG. 2. Further, the image processing apparatus 600 transfers printing instructions, necessary information, and data to the printing apparatus 510.

The printing apparatus 510 converts the bitmap image data, which is transmitted from the image processing apparatus 600 and in which the color value of each pixel is represented by output-device-dependent signal values, into a data format for printing, and performs printing on a medium based on the data obtained by the conversion. Data transfer between the image processing apparatus 600 and the printing apparatus 510 is performed via an interface such as a network, a USB, a local bus, or the like.

As illustrated in FIG. 6, the image processing apparatus 600 includes the UI unit 601, the working memory 602, the data input/output unit 603, the calculation unit 604, and the large-capacity storage unit 605.

The UI unit 601 has, for example, an input device (an operation unit) such as a keyboard and mouse, and an output device (a display unit) such as a liquid crystal display. The UI unit 601 may be configured with a touch-sensitive panel or the like equipped with input/output functions. The UI unit 601 takes on a user interface function to allow the user to perform various inputs including color settings and the like, and to display information necessary for the user.

The large-capacity storage unit 605 is configured with an HDD or an SSD, and stores and manages software such as an OS and a system program, as well as data such as various setting values and parameters necessary for various processes.

The calculation unit 604 is configured with a CPU, a GPU, etc., and executes software stored in the large-capacity storage unit 605 using the working memory 602.

The data input/output unit 603 is an interface that performs the inputting of print jobs and transferring of data to the printing apparatus 510.

A function (a functional unit) for executing each later-described process (step) is implemented by the calculation unit 604 executing a predetermined program to instruct each unit in the image processing apparatus 600 and performing information communication. For example, the function of performing the CMS processing (the color conversion processing) using the ICC profiles illustrated in FIG. 2 is also implemented by processing performed by the calculation unit 604, but there is no limitation as such. Alternatively, for example, hardware such as a GPU (a Graphics Processing Unit) for speeding up computation or an FPGA (a Field Programmable Gate Array), or the like may be used. A functional unit may be implemented through cooperation of software and hardware such as a dedicated IC, or a part or all of the functions may be implemented by hardware alone.

FIG. 6 is a block diagram for explaining the control configuration of the printing apparatus 510. The printing apparatus 510 has the data transfer unit 611, the print control unit 612, the image processing unit 613, the large-capacity storage unit 614, the print engine 615, and the printing apparatus control unit 616.

The printing apparatus control unit 616 is a unit that performs control of the entire printing apparatus 510. The printing apparatus control unit 616 includes a CPU, memory, the controller 617 equipped with various I/O interfaces, and a power supply that is not illustrated in the drawings. The operation of the printing apparatus 510 is controlled based on commands from the controller 617 included in the printing apparatus control unit 616 or the information processing apparatus 507 (see FIG. 5) that is a host computer or the like connected to the controller 617 via an I/O interface. Although a configuration in which the information processing apparatus 507 exists outside the printing apparatus 510 is illustrated in the diagram in FIG. 5 as an example, it is also possible that the information processing apparatus 507 exists internally in the printing apparatus 510.

The data transfer unit 611 receives a print job output from the image processing apparatus 600. The print job includes the original image data, the print setting information, the color space information (information regarding the device-dependent color space and the area thereof after color conversion), and the like. The received original image data is image data converted by the image processing apparatus 600 into bitmapped data, and the signal values thereof are converted into output-device-dependent signal values, and in addition to that the signal values are quantized to lower bits to compress the data.

Of the received print job, the data transfer unit 611 sends the original image data to the image processing unit 613 and the print setting information to the print control unit 612.

The print control unit 612 controls the operation of the print engine 615 according to the print setting information. The print engine 615 is configured with a print head that ejects ink, a supply system that supplies ink to the print head, and the like, and executes an ejection operation of the ink according to the image data on which a series of image processing has been performed by the image processing unit 613.

Note that in the printing system illustrated in FIG. 6, the image processing apparatus 600 and the printing apparatus 510 are each configured as an independent apparatus, but, for example, the image processing apparatus 600 may be enclosed within the printing apparatus 510.

As illustrated in FIG. 6, the image processing such as color conversion and the like may be performed by the image processing apparatus 600 that differs from the printing apparatus 510. For example, in a case of commercial and industrial printing, one vendor is unlikely to design all the systems, and, as illustrated in FIG. 6, generally the printing apparatus 510 is connected to existing external systems and workflow software.

From the viewpoint of maintaining accuracy, it is desirable that the signal values of the original image data are transmitted from the image processing apparatus 600 to the printing apparatus 510 with the high bit preserved. However, in a case of transmitting image data with high-bit signal values, since the amount of data to be transmitted increases, time is required for transmission, thereby making high-speed output impossible. Particularly for commercial and industrial printing, an inability to output at high speeds can become a problem because productivity decreases. For this reason, although it is conceivable to use a communication apparatus capable of high-speed data transfer, the burden of introducing the communication apparatus will be incurred. Therefore, in a case of transmitting image data with high-bit signal values between apparatuses, in general, the image data is transmitted after the signal values of the image data are quantized into low-bit signal values.

In a case of quantizing high-bit signal values to low-bit signal values, conversion including bit shifting such as, for example, simply converting a fixed-point format with more than 32 bits to a 16-bit or 8-bit integer type may be performed. In this case, the number of gradations in the image may be reduced due to bit loss. As a result, details in dark areas and highlights within the image may be lost, resulting in deterioration of the image quality. If an attempt is made to quantize the signal values to low-bit signal values in a way that does not reduce the number of gradations, the processing becomes complicated, and it may be difficult to cause an existing image processing apparatus to perform such processing. Therefore, in the present embodiment, a method of quantizing to a low-bit signal value using a simpler method so as not to reduce the number of gradations is described.

[Sequence in the Printing System]

Figure 7:
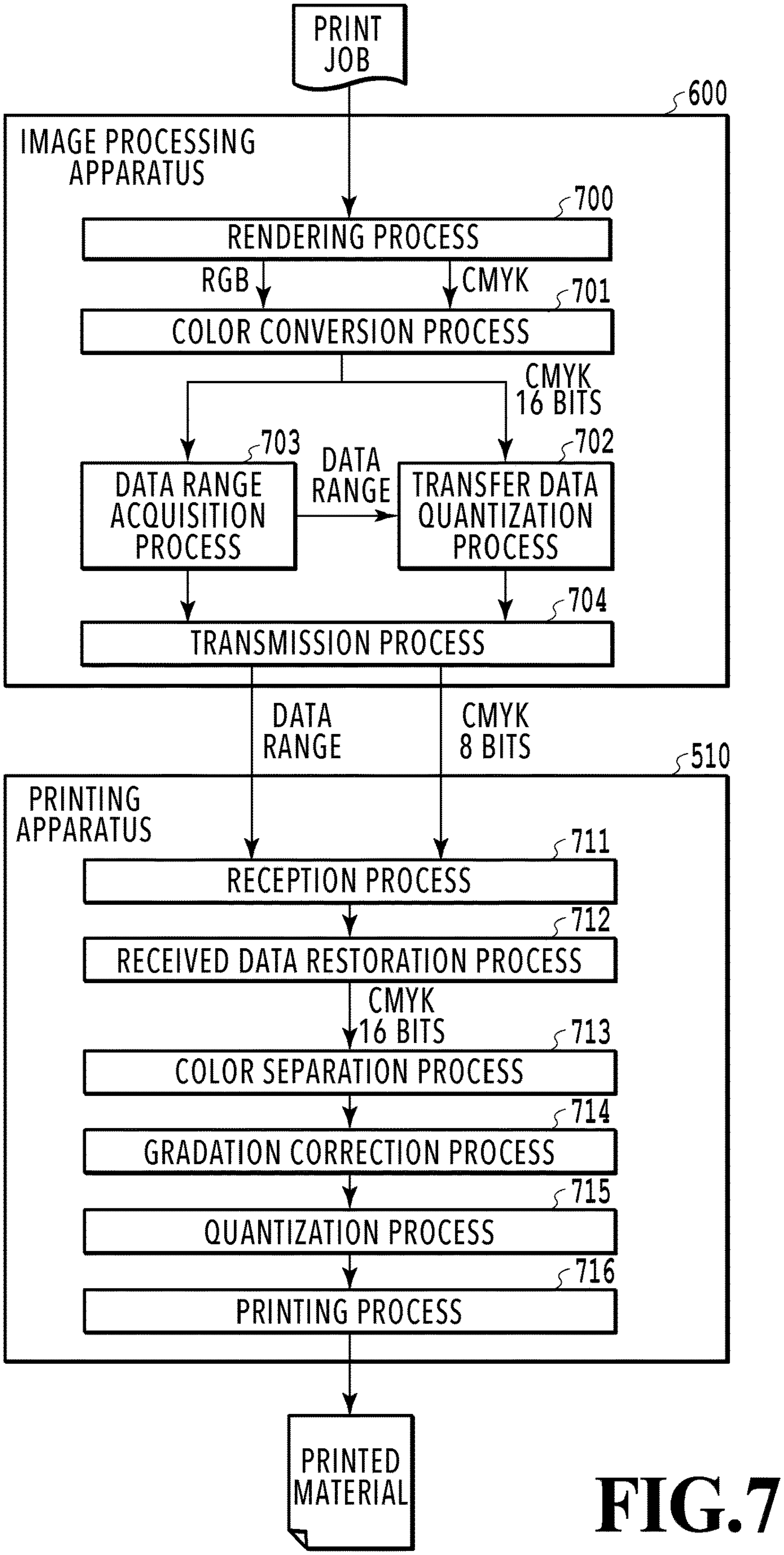
FIG. 7 is a diagram illustrating a printing sequence in a printing system.

FIG. 7 is a diagram illustrating the printing sequence in the printing system of the present embodiment. In the present embodiment, an explanation is given on the premise that a print job is input to the image processing apparatus 600. It is assumed that the original image data included in the print job is PDL image data. The original image data includes a command for rendering an object using color information in the RGB work color space in which the signal values of each RGB channel are luminance signal values. Alternatively, it is assumed that a command for rendering an object using color information in the CMYK work color space defined by the amount of CMYK ink used is included.

First, the processes executed by the image processing apparatus 600 are explained. The explanation is given on the premise that each process (step) explained below is performed by the calculation unit 604 instructing each unit in the image processing apparatus 600 and performing information communication. For example, the processing of each process performed by the image processing apparatus 600 in FIG. 6 is performed by the calculation unit 604 loading the program code stored in the large-capacity storage unit 605 into the working memory 602 and executing it. Further, a part or all of the functions in the processes of FIG. 7 may be implemented by hardware such as an ASIC or an electronic circuit.

In the rendering process 700, the calculation unit 604 interprets the PDL of the original image data included in the print job and performs rendering processing. Then, the calculation unit 604 converts the original image data into bitmap original image data. After the rendering process 700, the color conversion process 701 is performed.

In the color conversion process 701, the calculation unit 604 performs color conversion using conversion parameters, such as those explained in FIG. 2, on the RGB signal values or the CMYK signal values, which are the pixel values of each pixel of the original image data which has been processed in the rendering process 700 and is targeted for color conversion processing. ICC profiles for each color space that include conversion parameters are held in the large-capacity storage unit 605. Based on the input-device-dependent signal value information and the output-device-dependent signal value information designated via the UI unit 601, the calculation unit 604 acquires the ICC profiles to be used for the color conversion from the large-capacity storage unit 605. As a result of the color conversion process 701, the signal values representing the color of the target object in the original image data are converted into output-device-dependent signal values. For example, as illustrated in FIG. 4A, conversion of the signal values in the CMYK color space of CRPC5 into signal values corresponding to the reproducible color gamut of an inkjet printer is performed.

In commercial and industrial printing, the final product is often printed material obtained by printing by the printing apparatus 510. Therefore, the color conversion process 701 in the image processing apparatus 600 is explained on the premise that the conversion processing is performed to high-bit signal values greater than high-resolution 8-bit signal values in order to maintain the image quality in the printed material. It can also be said that the color conversion process 701 is a process of acquiring image data in which the color information is defined by high-bit signal values.

The image data after being converted into high-bit signal values has a large volume. Therefore, in the transfer data quantization process 702, in order to transmit the original image data to the printing apparatus 510, quantization is performed to compress the data amount of the original image data. In the present embodiment, quantization is performed on the signal values of the original image data after the color conversion process 701 from signal values defined in high bits (for example, 16 bits) to signal values defined in low bits (for example, 8 bits).

In the transmission process 704, the calculation unit 604 transmits to the printing apparatus 510 the original image data in which the signal values are quantized to 8 bits and the later-described data range information of the signal values. Details of the transfer data quantization process 702 and the data range acquisition process 703 are described later.

Next, an explanation is given of the processes executed by the printing apparatus 510. The processing of each process performed by the printing apparatus 510 illustrated in FIG. 7 is performed by the controller 617 loading a program code stored in the storage unit into the RAM and executing it. Further, apart or all of the functions in the processes of FIG. 7 may be implemented by hardware such as an ASIC or an electronic circuit. A part or all of the processes in FIG. 7 may be executed by the image processing unit 613, for example.

In the reception process 711, the controller 617 receives the original image data in which the signal values are quantized to 8 bits and the data range information of the signal values, which are transmitted from the image processing apparatus 600.

In the received data restoration process 712, the controller 617 performs processing to restore the signal values of the original image data to the processing bit number for the printing apparatus 510. The processing bit number for the printing apparatus 510 is greater than the processing bit number in the transfer data quantization process 702, and is assumed to be 16 bits in the following explanation. The controller 617 performs restoration so that the data range of the signal values of the original image data after the color conversion process 701 and the data range after the received data restoration process 712 are relatively the same. Details of the received data restoration process 712 are described later.

In the color separation process 713, the controller 617 converts the CMYK signal values restored to 16 bits into signal values for each color component corresponding to each CMYKOGB ink corresponding to the ink color used in the printing apparatus 510. This color conversion processing is performed by referring to a four-dimensional look-up table (a four-dimensional LUT) which is stored in advance in the large-capacity storage unit 614 and in which CMYK signal values and CMYKOGB signal values are associated. Specifically, CMYK signal values are converted to associated CMYKOGB signal values using the four-dimensional LUT.

In the gradation correction process 714, the controller 617 acquires the CMYKOGB signal values obtained in the color separation process 713. Then, in the gradation correction process 714, the controller 617 performs a linear conversion for each ink so that the density represented on the medium maintains a linear relationship with the input signal values. This linear conversion is executed with reference to a one-dimensional LUT for each ink stored in advance in the large-capacity storage unit 614. The conversion processing of the signal values performed in the color conversion process 701, the color separation process 713, and the gradation correction process 714 are all performed using 16-bit multi-value signals, as described above. The multi-value data on which the gradation correction has been performed is passed to the quantization process 715.

In the quantization process 715, the controller 617 converts the multi-value data on which the gradation correction has been performed into binary data indicating recording of dots with "1" and non-recording with "0" for each ink.

The controller 617 sends the binary data resulting from the quantization process 715 to the print engine 615. Then, in the printing process 716, the controller 617 causes the print head included in the print engine 615 to execute an ink ejection operation according to the binary data and print an image corresponding to the original image data onto the medium.

[Regarding the Transfer Data Quantization Process]

Next, an explanation is given of details of the transfer data quantization process 702 and the data range acquisition process 703. In the transfer data quantization process 702 in the present embodiment, quantization to lower bits is performed on the signal values using the data range information indicating the data range of the signal values after the color conversion in the color conversion process 701. The data range information is data indicating the maximum value and minimum value of the signal values of the number of bits after the color conversion in the color conversion process 701. The following explanation is given on the premise that the signal values of the original image data are converted into CMYK 16-bit signal values in the color conversion process 701.

In the data range acquisition process 703, the calculation unit 604 performs processing to acquire the data range information. In the data range acquisition process 703 of the present embodiment, the actual minimum value and maximum value of the signal values of each channel are acquired from the data distribution of the 16-bit signal values of each CMYK channel (each color component) in the original image data obtained by the color conversion in the color conversion process 701. For example, the calculation unit 604 acquires the maximum value and minimum value of the signal values of the C channel in the original image data by checking the signal values of the C channel for all pixels of the bitmap original image data. Using a similar method, the calculation unit 604 acquires the maximum value and minimum value of the signal values of the M channel, the maximum value and minimum value of the signal values of the Y channel, and the maximum value and minimum value of the signal values of the K channel. The data range information indicating the minimum value and maximum value of the signal values of each CMYK channel of the original image data after the color conversion process 701 is output to the transfer data quantization process 702.

Figure 8:
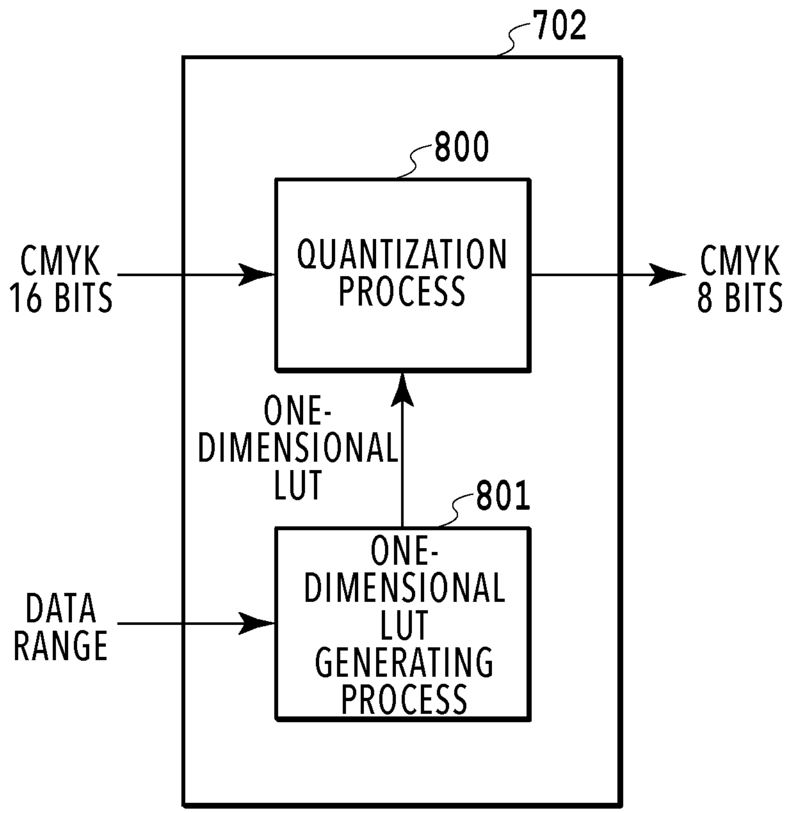
FIG. 8 is a diagram illustrating detailed processes of a transfer data quantization process.

FIG. 8 is a diagram illustrating the detailed processes of the transfer data quantization process 702. The transfer data quantization process 702 includes the one-dimensional LUT generating process 801 and the quantization process 800.

In the one-dimensional LUT generating process 801, the calculation unit 604 acquires the data range information indicating the minimum value and maximum value of each CMYK channel acquired in the data range acquisition process 703.

FIG. 9A is a diagram illustrating an example of the data range information, and illustrates an example of the maximum values and minimum values of the 16-bit signal values of each CMYK channel. In a case of 16 bits, the maximum possible signal value is 65,535, but the actual maximum value of the signal values of the original image data may be smaller than 65,535, and the actual minimum value of the signal values may be larger than 0. Therefore, as described above, signal values may not be used in the full range from 0 to 65,535 in the original image data.

In the one-dimensional LUT generating process 801, the calculation unit 604 generates a one-dimensional LUT for quantization for each CMYK channel. That is, a one-dimensional LUT for quantization corresponding to each of the four CMYK channels (the four color components) is generated.

FIG. 9B to FIG. 9E are graphs illustrating one-dimensional LUTs for quantization of each CMYK channel that are generated in a case where the data range information illustrated in FIG. 9A is acquired.

The generated one-dimensional LUTs for quantization are each one-dimensional LUT where an association is made such that the input is 16-bit signal values which are the signal values of the current original image data and the output is 8-bit signal values corresponding to the processing bit number in the transfer data quantization process 702. In the one-dimensional LUT generating process 801, the association is made such that the minimum value of the 16-bit signal values indicated by the data range information is converted to 0, which is the minimum value possible for an 8-bit signal value. Further, the association is made such that the maximum value of the 16-bit signal values indicated by the data range information is converted to 255, which is the maximum value possible for an 8-bit signal value. For signal values between the maximum value and the minimum value indicated by the data range information, association with 8-bit signal values by linear extension is performed, thereby generating the one-dimensional LUT for quantization.

FIG. 9B is a graph illustrating the one-dimensional LUT for quantization corresponding to the cyan (C) channel. As illustrated in FIG. 9A, the maximum value of the 16-bit signal values of the C channel of the original image data after the color conversion in the color conversion process 701 is 48,640. Therefore, the one-dimensional LUT for quantization is generated so that the input 48,640 is converted to 255 as an 8-bit signal value. Similarly, the minimum value of the 16-bit signal values of the C channel is 2,560, and the one-dimensional LUT for quantization is generated so that the input 2,560 is converted to 0 as an 8-bit signal value. Therefore, the one-dimensional LUT for quantization is generated so that 2,560 to 48,640 out of the 16-bit full range of 0 to 65,535 is converted to the 8-bit full range. Therefore, it is possible to narrow down the range of possible input signal values corresponding to the output signal value being 1.

In the quantization process 800, the calculation unit 604 performs quantization processing using the one-dimensional LUTs for quantization corresponding to the respective channels to convert the signal values of each CMYK channel, which are the pixel values of each pixel of the original image data after the color conversion process 701, into 8-bit compressed signal values.

Figure 10A:
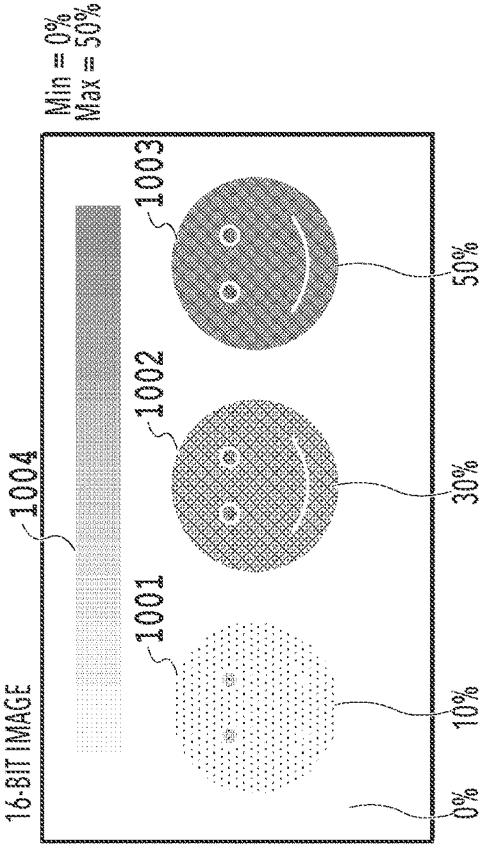
FIG. 10A to FIG. 10D are diagrams for explaining the processing of the transfer data quantization process.

FIG. 10A to FIG. 10D are diagrams for simply explaining the processing of the transfer data quantization process 702. FIG. 10A represents an image illustrating the original image data before being quantized into low-bit signal values. That is, FIG. 10A is a diagram of an image in which the color information is defined by 16-bit signal values. In FIG. 10A, for simplicity, it is assumed that the color of the original image data is represented by signal values of one channel. If the signal values are displayed in percentage, it is assumed that in the original image data after the color conversion process 701, the color information for the background color is defined as a signal value (a density) of 0%. Similarly, it is assumed that the color information is defined as a signal value (a density) of 10% for the object 1001, 30% for the object 1002, and 50% for the object 1003. Further, the object 1004, in which a gradation is represented in 256 gradations using signal values from 0% to 50%, is arranged.

Figure 10B:
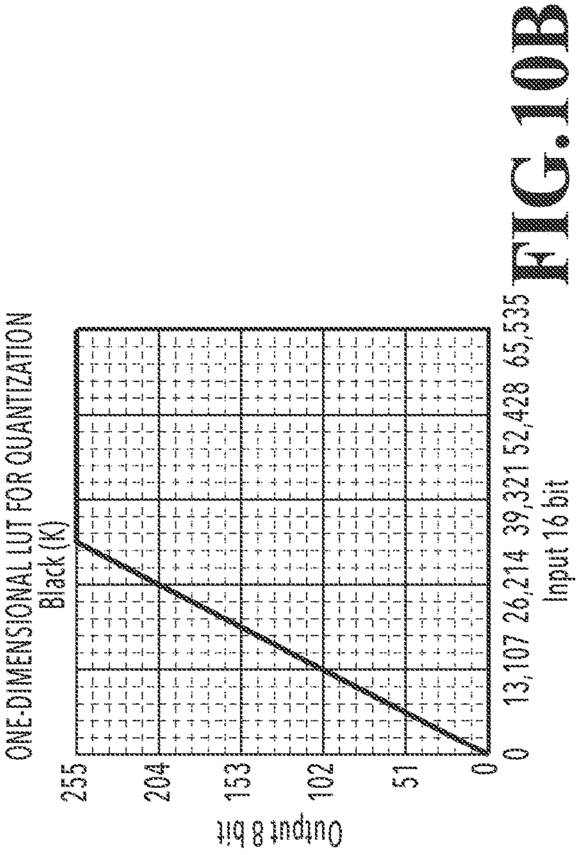

FIG. 10B is a diagram of a graph illustrating the one-dimensional LUT for quantization generated in the one-dimensional LUT generating process 801. If the data range acquisition process 703 is performed on the image in FIG. 10A, 32,768, which corresponds to a percentage display value of 50%, is acquired as the maximum value of the signal values. Further, 0 corresponding to 0% is acquired as the minimum value of the signal values.

If the calculation unit 604 generates a one-dimensional LUT for quantization using the maximum value and minimum value of these 16-bit signal values, a LUT is generated so that once 32,768 is input as a 16-bit signal value, the output is 255, which is the maximum possible value of 8 bits.

Figure 10C:
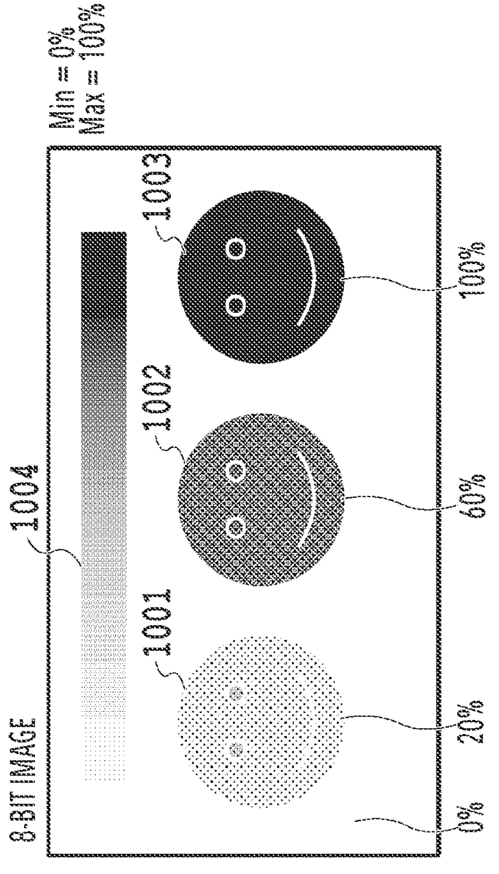

FIG. 10C is a diagram of an image illustrating the image data obtained by quantizing the 16-bit signal values of the image data corresponding to the image illustrated in FIG. 10A into 8-bit signal values using the method of the present embodiment. Displayed in percentage, the data range of the signal values in the image data corresponding to the image in FIG. 10C was 0% to 50% before quantization, but is extended to 0% to 100%. The object 1004 in which gradation is represented in FIG. 10C is represented from 0% (0), which is the minimum possible value of 8 bits, to 100% (255), which is the maximum value. Since the data range is extended at the time of quantization, the number of gradations of the object 1004 is maintained at the pre-quantized 256 gradations also in FIG. 10C.

As a comparative example, suppose that a one-dimensional LUT for quantization is generated so that in the quantization process, if 65,535, which is the maximum possible value of 16 bits, is input, then 255, which is the maximum possible value of 8 bits, is output, and if 0 is input, then 0 is output. It is further assumed that 16-bit signal values are quantized into 8-bit signal values using the one-dimensional LUT for quantization. In this case, the 16-bit signal values from 0% (0) to 100% (65,535) are quantized to correspond to the 8-bit signal values from 0% (0) to 100% (255). The 256 gradations represented by 16-bit single values from 0% (0) to 50% (32,768) in the input image becomes 128, i.e., half the number of gradations of 256, after quantization into 8 bits using the method of the comparative example. Therefore, according to the quantization of the present embodiment, data can be compressed while inhibiting deterioration in the number of gradations, compared to a method such as the comparative example.

Further, in the present embodiment, quantization to low bits can be performed using a one-dimensional LUT. A one-dimensional LUT can also be generated by acquiring the maximum value and minimum value of the signal values after the color conversion process 701. Therefore, there is no need for complicated processing such as determining a quantization method for each pixel, and thus compression of data can be performed using a simpler method while inhibiting deterioration in the number of gradations.

Further, in the transmission process 704, the calculation unit 604 transmits the original image data in which the signal values are quantized to 8 bits to the printing apparatus 510. Furthermore, the calculation unit 604 transmits the data range information used to generate the one-dimensional LUT for quantization such as in FIG. 9A to the printing apparatus 510 as one piece of print setting information.

[Regarding the Received Data Restoration Process]

Figure 11:
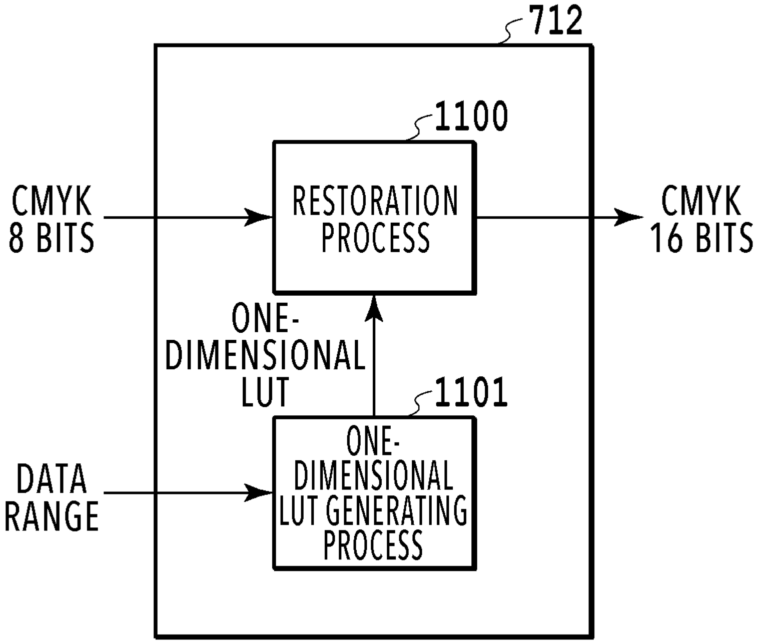
FIG. 11 is a diagram illustrating detailed processes of a received data restoration process.

FIG. 11 is a diagram illustrating the detailed processes of the received data restoration process 712 in the printing apparatus 510. The received data restoration process 712 includes the one-dimensional LUT generating process 1101 and the restoration process 1100.

In the one-dimensional LUT generating process 1101, the controller 617 acquires the data range information of the signal values before quantization of each channel included in the print setting information transmitted from the image processing apparatus 600. For example, the data range information indicating the maximum value and minimum value of the signal values before quantization in the transfer data quantization process 702 as illustrated in FIG. 9A is acquired.

In the one-dimensional LUT generating process 1101, the controller 617 generates a one-dimensional LUT for restoration for each CMYK channel. That is, the one-dimensional LUTs for restoration corresponding to the four CMYK channels (the four color components) are generated, respectively. The one-dimensional LUT for restoration is a one-dimensional LUT in which an association is made such that the inputs are the signal values in the processing bit number of the transfer data quantization process 702 (the signal values of the received original image data), and the outputs are the signal values in the processing bit number of the received data restoration process 712. The following explanation is given on the premise that the processing bit number of the color conversion process 701 is 16 bits. Further, it is assumed that the processing bit number of the transfer data quantization process 702 is 8 bits. Furthermore, it is assumed that the processing bit number of the received data restoration process 712 is 16 bits. That is, in the reception process 711, it is assumed that the original image data with 8-bit signal values and the data range information indicating information of 16-bit signal values are received.

In the one-dimensional LUT generating process 1101, an association is made such that the controller 617 converts 0, which is the minimum possible value for an 8-bit signal value, into the minimum value of the 16-bit signal values indicated by the data range information transmitted from the image processing apparatus 600. Further, the association is made such that 255, which is the maximum value possible for an 8-bit signal value, is converted into the maximum value of the 16-bit signal values indicated by the data range information. Then, the controller 617 generates the one-dimensional LUT for restoration by associating the values between the maximum value and minimum value so as to be linearly extended. That is, the one-dimensional LUT for restoration is generated so that the 8-bit signal values of 0 to 255 in each CMYK channel are returned to the data range of each CMYK channel before the transfer data quantization process 702.

FIG. 12A to FIG. 12D are diagrams of graphs illustrating the one-dimensional LUT for restoration of each CMYK channel generated in the one-dimensional LUT generating process 1101 in a case where the data range information illustrated in FIG. 9A is acquired.

Figure 12A:
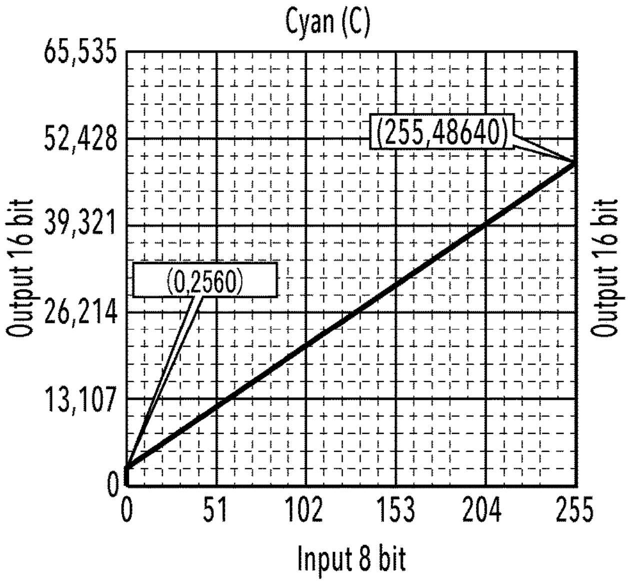
FIG. 12A to FIG. 12D are diagrams illustrating one-dimensional LUTs for restoration with graphs.
Figure 12B:
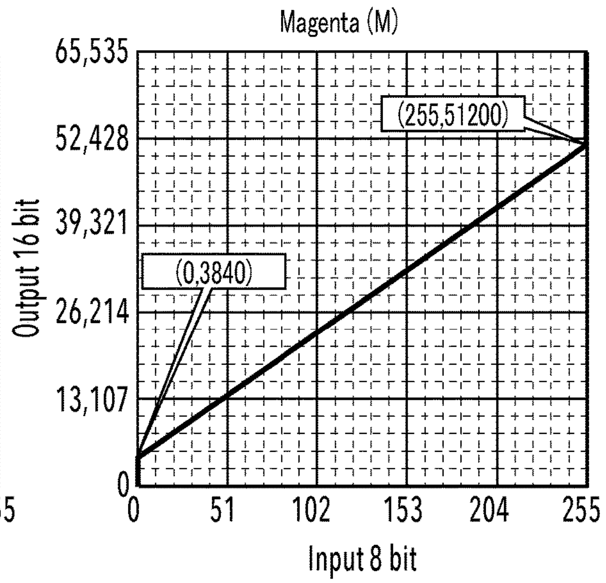
Figure 12C:
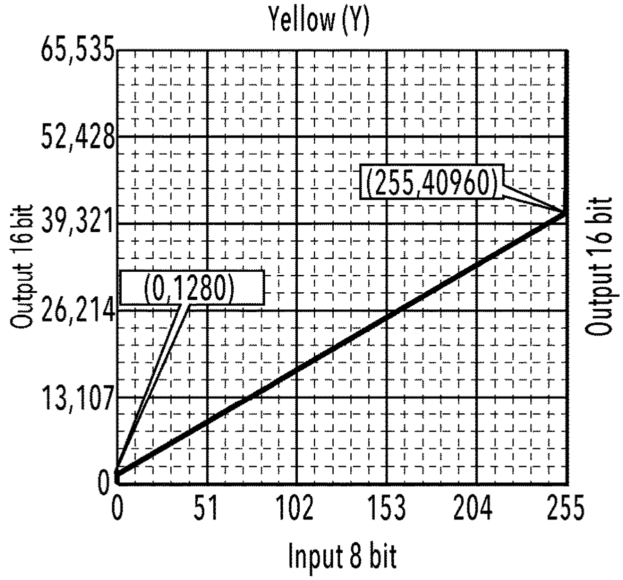
Figure 12D:
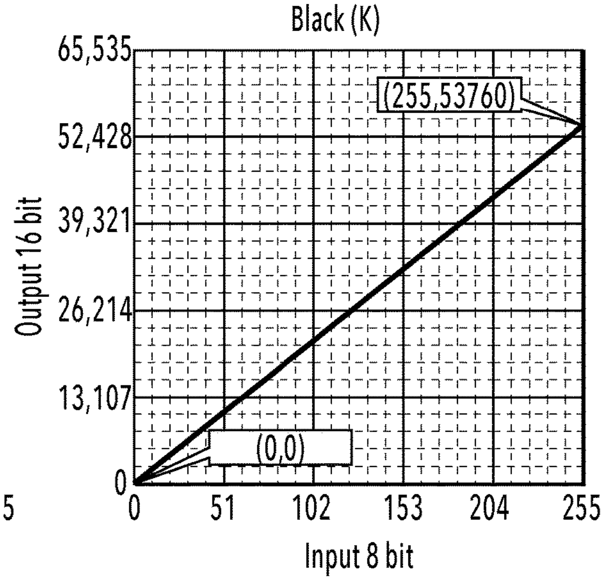

FIG. 12A is a graph illustrating the one-dimensional LUT for restoration corresponding to the cyan (C) channel. As illustrated in FIG. 9A, the maximum value of the 16-bit signal values of the C channel of the original image data after the color conversion in the color conversion process 701, which is the maximum value indicated by the data range information, is 48,640. Therefore, the one-dimensional LUT for restoration is generated so that 255, which is the maximum value possible for an 8-bit signal value, is converted into 48,640. Similarly, the minimum value of the 16-bit signal values of the C channel is 2,560, and the one-dimensional LUT for restoration is generated so that 0 as an 8-bit signal value is converted into 2,560.

The processing bit number of the received data restoration process 712 may be different from the bit number corresponding to the maximum value and minimum value indicated by the data range information. In this case, in the one-dimensional LUT generating process 1101, the controller 617 performs processing to convert the maximum value and minimum value indicated by the data range information into the values in the processing bit number of the received data restoration process 712. For example, if the bit number of the data range information is 16 bits and the processing bit number of the received data restoration process 712 is 12 bits, conversion of the bit numbers is performed by substituting the maximum value or minimum value of the data range information using the following formula.

$$\text{12-bit signal value}=(\text{16-bit signal value}/65{,}535)\times 4{,}095$$

Then, in the one-dimensional LUT generating process 1101, an association is made such that the minimum possible value (0) for an 8-bit signal value is converted into the minimum value of the 12-bit signal values indicated by the data range information. Further, the association is made such that the maximum value possible for an 8-bit signal value (255) is converted into the maximum value of the 12-bit signal values. Thus, the one-dimensional LUT for restoration in which the input is the 8-bit signal values and the output is the 12-bit signal values is generated.

Figure 10D:
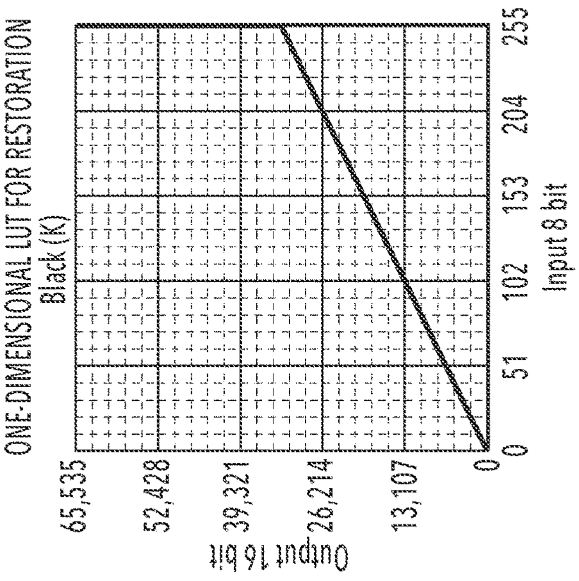

As described above, FIG. 10C illustrates the image data in which the color information is defined by 8-bit signal values before the restoration processing. FIG. 10D illustrates the one-dimensional LUT for restoration generated from the data range of the minimum value of 0% (0) and the maximum value of 50% (32,768) of the signal values before quantization.

In the restoration process 1100, the controller 617 inputs the signal values of each pixel of the original image data before the restoration processing into the one-dimensional LUT for restoration, and performs processing to restore the signal values that are quantized to low bits. As a result, the signal values compressed to 8 bits are restored to 16-bit signal values. As a result of the restoration process 1100, the original image data transmitted from the image processing apparatus 600 is restored to image data representing an image in which the color information is defined by 16-bit signal values as illustrated in FIG. 10A. In the restoration process 1100, the 8-bit signal values are linearly converted into the original data range of 16-bit signal values, and thus restoration is done with the number of gradations before the restoration processing preserved.

As explained above, in the present embodiment, one-dimensional LUTs are generated by associating the minimum value and maximum value of the high-bit signal values with the minimum value and maximum value possible for low bits, respectively, and associating the values in between using linear extension. Then, based on the generated one-dimensional LUTs, conversion of high-bit signal values into low-bit signal values is performed. In this way, according to the present embodiment, since quantization is performed using one-dimensional LUTs, high-bit signal values can be quantized to low-bit signal values in a simple manner while inhibiting the impact of bit loss. Further, in the restoration processing where low-bit signal values are converted to high-bit signal values, the restoration processing is performed so that the data range of the signal values returns to the state before quantization. Therefore, it is possible to restore high-bit image data while inhibiting deterioration in the number of gradations due to quantization to low bits. Therefore, according to the present embodiment, even existing image processing apparatuses can appropriately perform the quantization processing.

According to the present embodiment, in a case where image data of a narrow color gamut is compressed by bit number conversion and transmitted to an image output apparatus capable of color reproduction in a wide color gamut, data compression which inhibits deterioration in gradation reproducibility due to bit number conversion can be performed using a simpler method. Especially in a case where the data range of the original image data after color conversion by the CMS is narrow (the maximum value of the signal values is small or the minimum value is large), it is possible to inhibit a reduction in the number of gradations due to bit number conversion.

Note that in the above description, an explanation is given where the processing bit number in the color conversion process 701 is 16 bits, the processing bit number in the transfer data quantization process 702 is 8 bits, and the processing bit number in the received data restoration process 712 is 16 bits. However, these processing bit numbers are examples. Assuming that the processing bit number in the color conversion process 701 is N bits, the processing bit number in the transfer data quantization process 702 is M bits, and the processing bit number in the received data restoration process 712 is L bits, it is sufficient as long as the relationships of N>M and L>M hold true. For example, N bits may be 10 bits, M bits may be 8 bits, and L bits may be 16 bits, or N bits may be 16 bits, M bits may be 8 bits, and L bits may be 12 bits.

Further, the data range information transmitted to the printing apparatus 510 in the transmission process 704 of the image processing apparatus 600 may be information indicating the maximum value and minimum value of the signal values before the quantization in the transfer data quantization process 702. That is, the data range information transmitted in the transmission process 704 may be different information from the data range information used to generate a one-dimensional LUT for quantization in the one-dimensional LUT generating process 801. For example, in the transmission process 704, a one-dimensional LUT for quantization used in the transfer data quantization process 702 may be transmitted to the printing apparatus 510 as the data range information. In that case, in the received data restoration process 712 of the printing apparatus 510, the minimum value and maximum value of the signal values may be acquired from the shape of the one-dimensional LUT for quantization to generate the one-dimensional LUT for restoration.

Second Embodiment

In the first embodiment, an explanation is given of a method in which the data range information indicating the maximum value and minimum value of the signal values is acquired by examining the signal values after color conversion of each pixel in the original image data after color conversion. In the present embodiment, an explanation is given of another method used to acquire the data range information.

Figure 13:
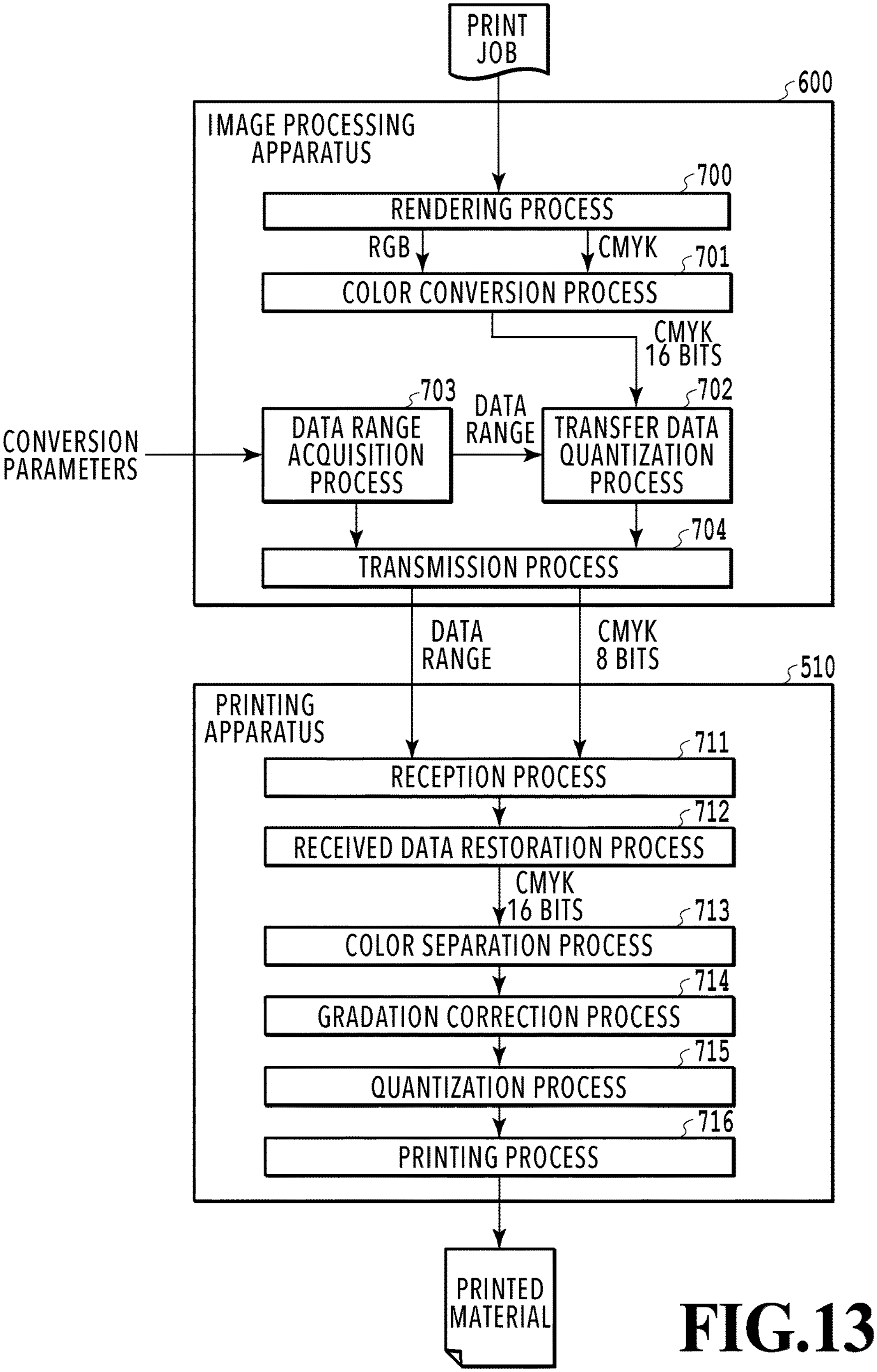
FIG. 13 is a diagram illustrating a printing sequence in the printing system.

FIG. 13 is a diagram illustrating a printing sequence in the printing system of the present embodiment. Processes similar to those in the first embodiment are given identical signs and explanations thereof are omitted. As illustrated in FIG. 2, in the color conversion process 701 by the CMS, input-device-dependent signal values are converted into output-device-dependent signal values using a Source Profile and a Destination Profile. In the data range acquisition process 1301 of the present embodiment, conversion parameters used for the color conversion in the color conversion process 701 are acquired from the Source Profile and the Destination Profile. Further, in the data range acquisition process 1301, the maximum value and minimum value of the signal values for each color component are calculated using the acquired conversion parameters, and the data range information before quantization of the original image data is acquired.

Figure 14:
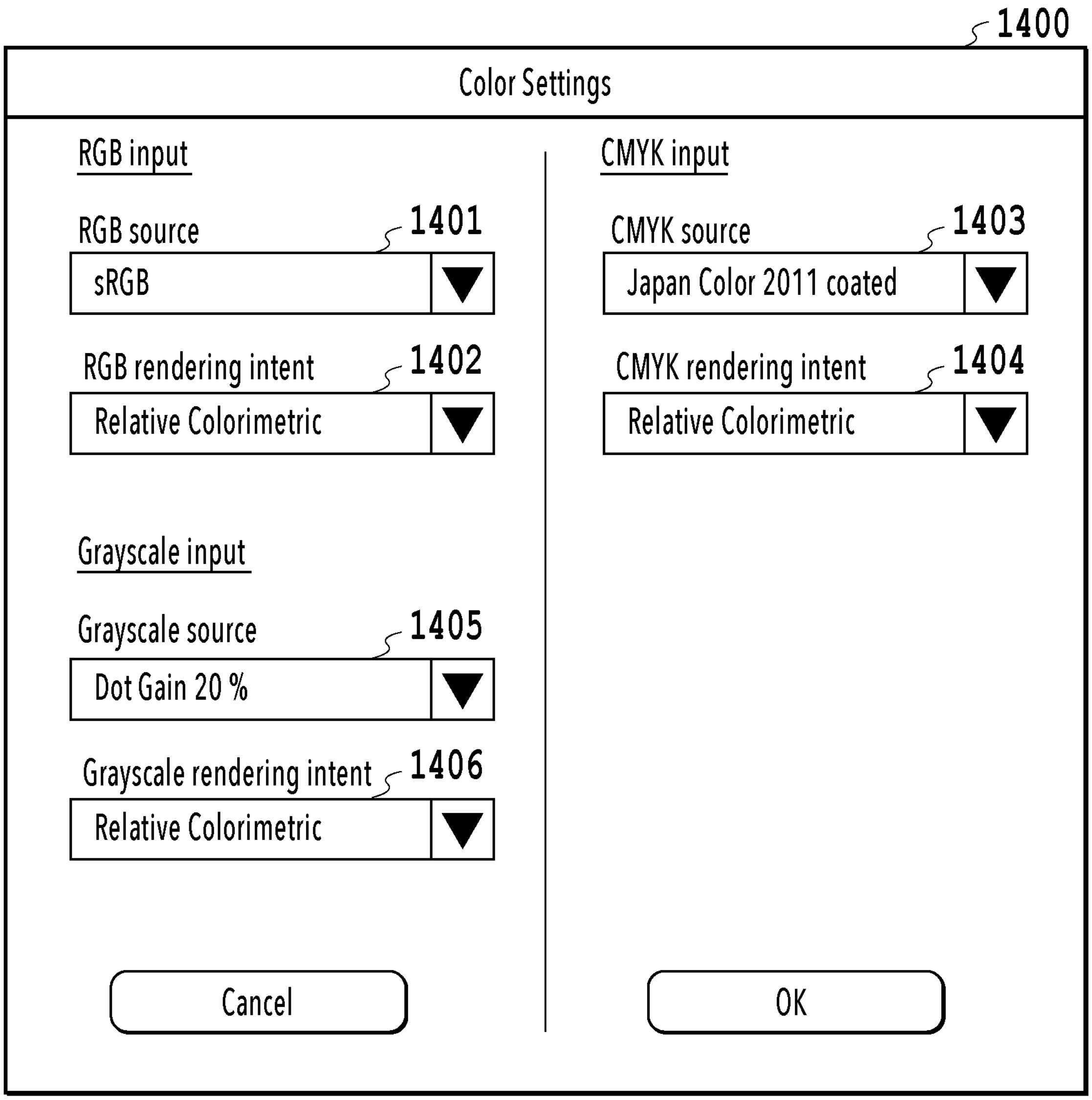
FIG. 14 is a diagram illustrating an overall color setting UI screen.

FIG. 14 is a diagram illustrating the overall color setting UI screen displayed on the UI unit 601 of the image processing apparatus 600. The settings related to the Source Profile illustrated in FIG. 2 are performed based on the content selected by the user via the overall color setting UI screen 1400. On the overall color setting UI screen 1400, settings are performed for the color space of objects in the original image data.

The "RGB source" pull-down 1401 on the overall color setting UI screen 1400 is used by the user to select a detailed color space in a case where the color information is designated in RGB in the original image data. For example, in a case where a detailed color space is not designated in the original image data, the user selects a detailed color space from the pull-down 1401. As illustrated in FIG. 2, the Source Profile includes an ICC profile for each color space, and thus the color space selected by the user is used to determine which ICC profile to use.

For example, in a case where sRGB is selected from the pull-down 1401, it is considered that the RGB signal values in the original image data are defined by the sRGB color space, and the corresponding ICC profile is acquired. In the color conversion process 701, color conversion processing to a device-independent color space is performed using the acquired ICC profile.

In the "RGB rendering intent" pull-down 1402, a gamut compression method for color conversion of RGB signal values is selected. As compression methods, "Perceptual", "Saturation", "Relative Colorimetric", and "Absolute Colorimetric" are generally known, and these four types can also be designated in the present embodiment.

The ICC profile for each color space includes a color conversion table (a LUT) for each compression method (rendering intent). Therefore, the compression method selected by the user is used to determine which color conversion LUT to use.

Similarly, the "CMYK source" pull-down 1403 is used to select a detailed color space in a case where the signal values are designated in CMYK in the original image data. Similar to the pull-down 1401, a color space is selected from the pull-down 1403 in a case where a detailed color space is not designated in the original image data. Similarly to the pull-down 1402, the compression method is selected with the "CMYK rendering intent" pull-down 1404 in a case where the color information of the original image data is designated by CMYK signal values.

The "Grayscale source" pull-down 1405 is used to select a detailed color space for the original image in a case where a detailed color space is not designated. Similar to the pull-down 1402, the compression method is selected with the "Grayscale rendering intent" pull-down 1406 in a case where no detailed color space is designated.

Figure 15A:
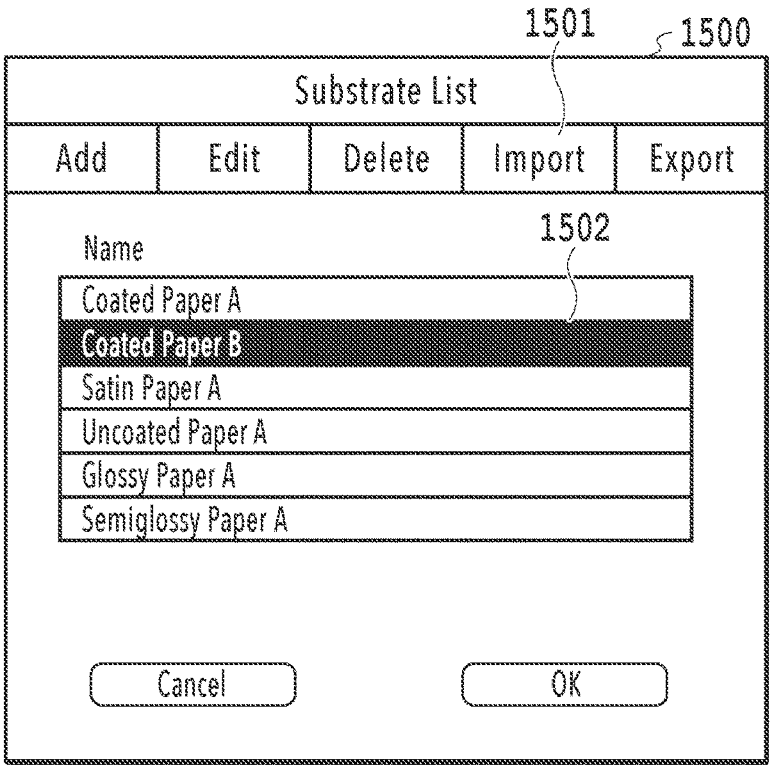
FIG. 15A and FIG. 15B are diagrams for explaining a UI screen for determining conversion parameters of the Destination Profile.
Figure 15B:
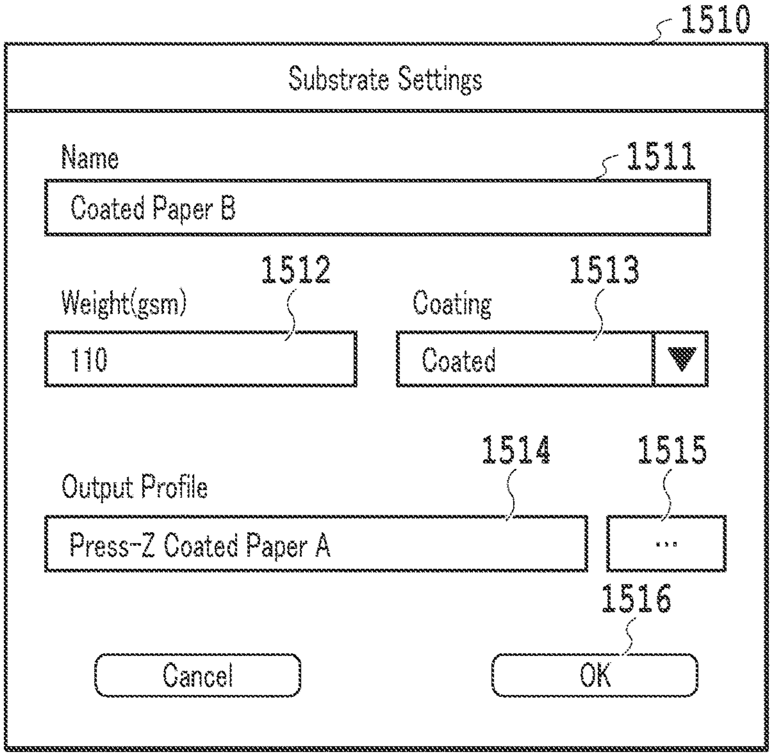

FIG. 15A and FIG. 15B are diagrams for explaining a UI screen for determining the conversion parameters in the Destination Profile, which is displayed on the UI unit 601 of the image processing apparatus 600. The Destination Profile is set and saved in association with a recording medium (hereinafter referred to as a "medium") such as printing paper or the like used in the printing apparatus 510.

The media list screen 1500 illustrated in FIG. 15A is a UI screen for displaying the types of media used in the printing apparatus 510 and accepting selections from the user. The menu bar 1501 includes five types of buttons. By pressing a button, the user can give an instruction to add a new medium, edit a registered medium, delete a registered medium, import a medium using a file, or export a registered medium using a file.

The media setting screen 1510 illustrated in FIG. 15B is a screen that is displayed in a case where the "Add" or "Edit" button on the menu bar 1501 is pressed. The name of the type of medium is input by the user in the text box 1511 where "Name" is displayed in the media setting screen 1510. In the text box 1512 where "Weight" is displayed, the user inputs the weight per unit area of the medium. The pull-down 1513 where "Coating" is displayed includes candidates for the type of coating on the surface of the medium, and the user selects the type of coating for the medium from among the candidates.

If the reference button 1515 is pressed, a dialog that is not illustrated in the drawings is displayed containing a list of the ICC profiles corresponding to the Destination Profile. If the user selects a given ICC profile, the ICC profile corresponding to the Destination Profile used in the color conversion process 701 is displayed in the "Output Profile" text box 1514. If the OK button 1516 is pressed, the conversion parameters used for color conversion are determined from the ICC profile displayed in the text box 1514.

In this way, based on the contents designated on the overall color setting UI screen 1400 in FIG. 14 and the UI screens in FIG. 15A and FIG. 15B, an ICC profile is determined for converting input-device-dependent signal values used in the color conversion process 701 into device-independent signal values. Furthermore, an ICC profile for converting device-independent signal values into output-device-dependent signal values is determined. Then, the conversion parameters used for the color conversion in the color conversion process 701 are determined from the determined ICC profile.

In the data range acquisition process 1301 of the present embodiment, the calculation unit 604 acquires the conversion parameters determined based on the user's selection. Further, in the data range acquisition process 1301, the calculation unit 604 extracts signal values arbitrarily sampled from within a possible data range of the RGB, CMYK, and Grayscale signal values of the input original image data. Then, the calculation unit 604 performs color conversion of the extracted signal values using the acquired conversion parameters. In the data range acquisition process 1301, the calculation unit 604 determines the minimum value and maximum value of each channel from the signal values output as a result of the color conversion, and the determined maximum value and minimum value of each channel is acquired as the data range information.

For example, in a case of an object whose color information is defined by signal values of each channel of CMYK, 11 signal values of each channel are extracted in 10% increments from among the signal values of 0% to 100% of each channel. Then, 14,641 (11×11×11×11) colors are input to the conversion parameters, so that color conversion is performed for each color. The minimum value and maximum value of each CMYK channel are determined from the signal values indicating the colors output as a result of the color conversion, and the determined maximum value and minimum value of each of CMYK are acquired as the data range information.

As an example, it is assumed that the color space designated as the color information of an object of the original image data included in a print job is the CMYK color space of CRPC5. In this case, as illustrated in the Column 401 of FIG. 4A, the combinations (the colors) of the sampled signal values are extracted among the possible signal values of each CMYK channel (each color component). Then, color conversion using conversion parameters is performed on the combinations (the colors) of the sampled signal values held in the Column 401, so as to obtain the combinations (the colors) of the signal values of the output-device-dependent color space such as those illustrated in the Column 402. The maximum value and minimum value are each determined from the signal values of each channel constituting the converted colors, that is, from the signal values held in each CMYK column of the Column 402, and are acquired as the data range information.

Similarly, for objects whose color information is defined by RGB and Grayscale signal values, the signal values are extracted at arbitrary sampling intervals for calculation of the signal values after color conversion. In a case where it is known in advance whether the original image data is RGB, CMYK, or Grayscale, it is better to determine the maximum value and minimum value from the calculation results of only the data type of the original image data.

Note that multiple one-dimensional LUTs, which are parameters used in the transfer data quantization process 702 and the received data restoration process 712, may be generated in advance based on the respective conversion parameters according to the media information and the color setting information. As described above, since the maximum value and minimum value of the signal values after color conversion can be determined from a conversion parameter, the one-dimensional LUT for quantization and the one-dimensional LUT for restoration can be generated in advance for each conversion parameter.

Furthermore, the one-dimensional LUT for quantization generated in advance is stored in the large-capacity storage unit 605 of the image processing apparatus 600 in association with the conversion parameter used for generation. Further, the one-dimensional LUT for restoration generated in advance is stored in the large-capacity storage unit 614 of the printing apparatus 510.

For example, in a case where the one-dimensional LUT for quantization is generated in advance, in the transfer data quantization process 702, the conversion parameter used in the color conversion process 701 is acquired by the above-described method. Then, in the transfer data quantization process 702, the processing for quantization into low-bit signal values may be performed by acquiring the one-dimensional LUT for quantization stored in association with the acquired conversion parameter from among the one-dimensional LUTs for quantization generated in advance. In this way, the conversion parameters may be used as the data range information indicating the maximum value and minimum value of the signal values after color conversion.

Third Embodiment

In the embodiments described above, an explanation is given where the image output apparatus that outputs an image based on the image data whose signal values are quantized to low bits is a printing apparatus, but the image output apparatus is not limited to a printing apparatus. Alternatively, for example, the image output apparatus may be an HDR display apparatus equipped with an HDR display which is a display device that can reproduce a wide color gamut. Therefore, in the present embodiment, an explanation is given of a method in which an HDR display apparatus receives image data whose signal values are quantized to low bits, so as to display an image based on the image data obtained by restoration processing of the signal values.

Figure 16:
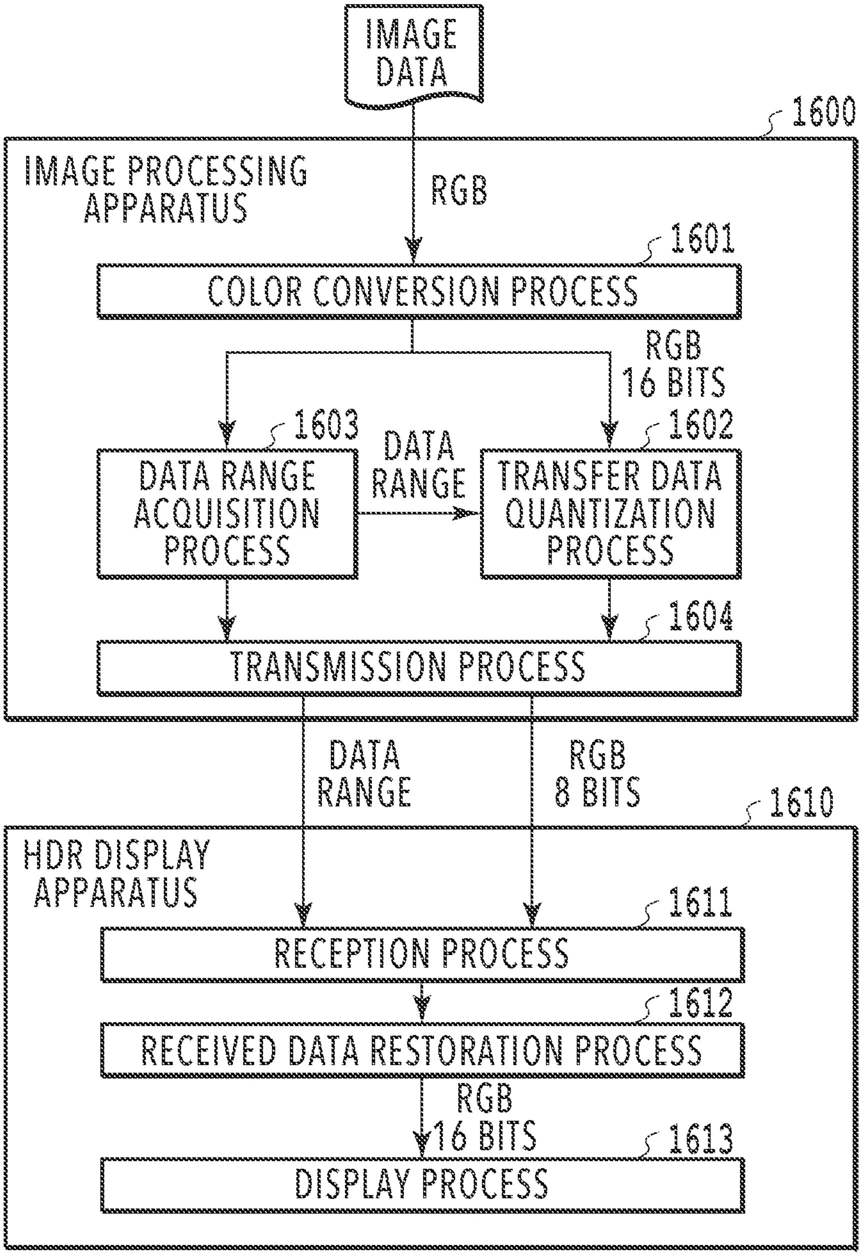
FIG. 16 is a diagram illustrating a sequence of a display processing in a display system.

FIG. 16 is a diagram illustrating a sequence of display processing in a display system for displaying, on a display (a display unit), an image based on image data whose color information is defined by high-bit signal values. The display system of the present embodiment includes the image processing apparatus 1600 and the HDR display apparatus 1610. The hardware configuration of the image processing apparatus 1600 is similar to that of the image processing apparatus 600.

An explanation is herein given of the processes executed by the image processing apparatus 1600. It is assumed that the image data input to the image processing apparatus 1600 is bitmap image data, and the color information of each pixel is defined by RGB luminance signal values. Therefore, unlike the image processing apparatus 600, the image processing apparatus 1600 does not include a process corresponding to the rendering process 700.

In the color conversion process 1601, color conversion processing is performed on the signal values of each pixel of input image data using a method including color management for allowing the HDR display apparatus 1610 to display colors correctly. Similar to the color conversion process 701, the color conversion in the color conversion process 1601 is performed using an ICC profile such as those illustrated in FIG. 2. It is assumed that the color conversion in the color conversion process 1601 is performed using 16 bits as the processing bit number. Therefore, it is assumed that the signal values of each RGB channel in each pixel in the image data obtained as a result of the color conversion process 1601 are 16-bit signal values.

The image data with 16-bit signal values, which is the image data obtained by the color conversion in the color conversion process 1601, is output to the transfer data quantization process 1602 and the data range acquisition process 1603.

In the data range acquisition process 1603, processing similar to that of the data range acquisition process 703 in FIG. 7 or the data range acquisition process 1301 in FIG. 13 is performed. Further, in the transfer data quantization process 1602, processing similar to that of the transfer data quantization process 702 in FIG. 7 is performed.

As a result of the quantization in the transfer data quantization process 1602, the signal values of the image data are converted to a bit number lower than 16 bits (for example, 8 bits). In the transmission process 1604, the image data with the signal values quantized to low bits is transmitted to the HDR display apparatus 1610.

Next, an explanation is given of the processes executed by the HDR display apparatus 1610. The HDR display apparatus 1610 has a control unit including a CPU, a ROM, a RAM, etc., and the processing of each process performed in the HDR display apparatus 1610 illustrated in FIG. 16 is performed by, for example, the CPU loading a program code stored in the ROM into the RAM and executing it. Alternatively, a part or all of the functions of the processes may be implemented by hardware such as an ASIC or an electronic circuit.

In the reception process 1611, the original image data whose signal values are quantized to low bits (for example, 8 bits) and the data range information of the color-converted signal values transmitted from the image processing apparatus 600 are received.

In the received data restoration process 1612, processing similar to that of the received data restoration process 712 is performed. That is, processing for restoring the signal values of the image data to the processing bit number used by the HDR display apparatus 1610 (for example, 16 bits) is performed.

In the display process 1605, the display engine displays the screen based on the image data in which the RGB signal values have been restored to 16 bits.

As explained above, according to the present embodiment, in a case of transmitting image data from a PC to a display after quantizing signal values to low bits, the impact of information loss due to quantization of the signal values to low bits can be reduced. For example, in a case of compressing low-contrast and low-saturation image data in which the distribution of colors is limited to a narrow color gamut using bit number conversion and then displaying the image data on an external HDR display that can reproduce a wide color gamut, it is possible to compress data while inhibiting deterioration in gradation reproducibility.

OTHER EMBODIMENTS

Note that in the embodiments described above, the transfer data quantization process does not have to be performed after the color conversion process. In addition, for example, by incorporating the one-dimensional LUT for quantization generated in the one-dimensional LUT generating process 801 into the conversion parameters used in the color conversion process 701, quantization to low bits can be performed in the color conversion process 701. For example, in a case where the Destination Profile includes a one-dimensional LUT for conversion to output-device-dependent signal values, in the color conversion process 701, processing for synthesizing that one-dimensional LUT and the one-dimensional LUT for quantization generated in the one-dimensional LUT generating process 801 may be performed. Then, conversion to output-device-dependent signal values and quantization to low bits may be performed by converting the signal values using the synthesized one-dimensional LUT in the color conversion process 701.

According to the technology of the present disclosure, it is possible to perform processing to quantize the signal values of image data to a low bit number in a simpler manner while inhibiting deterioration of image quality.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-067044 filed Apr. 17, 2023, which are hereby incorporated by reference wherein in their entirety.

What is claimed is:

1. An image processing apparatus comprising:

one or more memories storing instructions; and one or more processors executing the instructions to:

acquire image data whose color information is defined by N-bit signal values for each of color components;

acquire data range information indicating, for each of the color components, a first value representing a maximum value among the signal values of pixels in the acquired image data and a second value representing a minimum value among the signal values of pixels in the acquired image data;

perform a quantization to quantize the signal values for each of the color components in the acquired image data into M-bit signal values (N>M) based on the data range information; and transmit the quantized image data and the data range information in order to convert the signal values of the quantized image data into L-bit signal values (L>M), wherein the quantization is performed on the signal values for each of the color components in the acquired image data so that the first value becomes a maximum possible value in the range of the M bits and the second value becomes a minimum possible value in the range of the M bits, and wherein the first value is less than a maximum possible value in the range of the N bits, or the second value is greater than a minimum possible value in the range of the N bits.

2. The image processing apparatus according to claim 1, wherein the one or more processors execute the instructions to further generate, for each of the color components, a look-up table that outputs the M-bit signal values corresponding to the input N-bit signal values by associating the first value to the maximum possible value in the range of the M bits, associating the second value to the minimum possible value in the range of the M bits, and associating values between the first value and the second value to the M-bit signal values by linear extension, wherein the quantization is performed using the look-up table.

3. The image processing apparatus according to claim 1, wherein the data range information is data range information indicating the first value and the second value for each of the color components among the signal values of the entire pixels of the acquired image data.

4. The image processing apparatus according to claim 1, wherein the acquired image data is image data obtained as a result of performing color conversion processing to convert the signal values of image data targeted for processing into the N-bit signal values for each of the color components.

5. The image processing apparatus according to claim 4, wherein the data range information is data range information generated based on conversion parameters used in the color conversion processing.

6. The image processing apparatus according to claim 5, wherein the data range information is data range information indicating the first value and the second value for each of the color components from among the signal values obtained by converting signal values sampled from among the signal values corresponding to the image data targeted for processing into the M-bit signal value using the conversion parameters.

7. The image processing apparatus according to claim 5, wherein the one or more processors execute the instructions to further generate in advance parameters to be used in a case where the quantization is performed, based on the conversion parameters; and store the generated parameters in association with the corresponding conversion parameters, wherein the quantization is performed using the parameters associated with the conversion parameters used in the color conversion processing from among the stored parameters.

8. The image processing apparatus according to claim 4, wherein, in the color conversion processing, the signal values of the image data targeted for processing are converted so as to obtain image data with a color space that can reproduce a wider color gamut, compared to a color gamut that can be reproduced in a color space of the image data targeted for processing.

9. The image processing apparatus according to claim 2, wherein the look-up table used in the quantization is transmitted as data range information relating to the acquired image data.

10. The image processing apparatus according to claim 1, wherein the N and L are the same number.

11. An image processing method comprising:

acquiring image data whose color information is defined by N-bit signal values for each of color components;

acquiring data range information indicating, for each of the color components, a first value representing a maximum value among the signal values of pixels in the acquired image data and a second value representing a minimum value among the signal values of pixels in the acquired image data;

performing a quantization to quantize the signal values for each of the color components in the acquired image data into M-bit signal values (N>M) based on the acquired data range information; and transmitting the quantized image data and the data range information in order to convert the signal values of the quantized image data into L-bit signal values (L>M), wherein the quantization is performed on the signal values for each of the color components in the acquired image data so that the first value becomes a maximum possible value in the range of the M bits, and the second value becomes a minimum possible value in the range of the M bits and wherein the first value is less than a maximum possible value in the range of the N bits, or the second value is greater than a minimum possible value in the range of the N bits.

12. An image processing system comprising:

one or more memories storing instructions; and one or more processors executing the instructions to:

acquire image data whose color information is defined by N-bit signal values for each of color components;

acquire data range information indicating, for each of the color components, a first value representing a maximum value among the signal values of pixels in the acquired image data and a second value representing a minimum value among the signal values of pixels in the acquired image data;

perform a quantization to quantize the signal values for each of the color components in the acquired image data into M-bit signal values (N>M) based on the acquired data range information; and transmit the quantized image data and the data range information corresponding to the acquired image data in order to convert the signal values of the quantized image data into L-bit signal values (L>M), wherein the quantization is performed on the signal values for each of the color components in the acquired image data so that the first value becomes a maximum possible value in the range of the M bits and the second value becomes a minimum possible value in the range of the M bits, and wherein the first value is less than a maximum possible value in the range of the N bits, or the second value is greater than a minimum possible value in the range of the N bits.

13. The image processing system according to claim 12 wherein the one or more processors execute the instructions to further receive the quantized image data and the data range information corresponding to the acquired image data, which are transmitted by the transmitting;

convert the signal values of the quantized image data into the L-bit signal values, based on the received data range information; and output an image based on the image data whose signal values are converted to the L-bit signal value.

14. The image processing system according to claim 13, wherein the image is output by printing an image onto a recording medium based on the image data whose signal values are converted to the L-bit signal value.

* * * * *